United States Patent
Martin et al.

(10) Patent No.: US 7,416,709 B1
(45) Date of Patent: *Aug. 26, 2008

(54) METHOD FOR PERFORMING CRYSTALLIZATION TRIALS

(75) Inventors: Laurent Martin, Encinitas, CA (US); John W. Palan, San Diego, CA (US)

(73) Assignee: Takeda San Diego, Inc., San Diego, CA (US)

(*) Notice: Subject to any disclaimer, the term of this patent is extended or adjusted under 35 U.S.C. 154(b) by 181 days.

This patent is subject to a terminal disclaimer.

(21) Appl. No.: 11/016,495

(22) Filed: Dec. 16, 2004

Related U.S. Application Data

(63) Continuation of application No. 11/002,005, filed on Dec. 1, 2004.

(60) Provisional application No. 60/533,840, filed on Dec. 31, 2003.

(51) Int. Cl.
*C30B 35/00* (2006.01)

(52) U.S. Cl. .................. 422/245.1; 422/252; 117/13

(58) Field of Classification Search .............. 427/402; 422/81, 100, 101, 252, 245.1; 117/13
See application file for complete search history.

(56) References Cited

U.S. PATENT DOCUMENTS

| | | | |
|---|---|---|---|
| 5,658,802 A | 8/1997 | Hayes et al. | |
| 5,873,394 A | 2/1999 | Meltzer | |
| 6,036,920 A | 3/2000 | Pantoliano et al. | |
| 6,063,339 A | 5/2000 | Tisone et al. | |
| 6,148,878 A | 11/2000 | Ganz et al. | |
| 6,268,158 B1 | 7/2001 | Pantoliano et al. | |
| 6,360,792 B1 | 3/2002 | Ganz et al. | |
| 6,372,185 B1 | 4/2002 | Shumate et al. | |
| 6,395,231 B1 | 5/2002 | Kraemer et al. | |
| 6,402,837 B1 | 6/2002 | Shtrahman et al. | |
| 6,404,849 B1 | 6/2002 | Olson et al. | |
| 6,472,218 B1 | 10/2002 | Stylli et al. | |
| 6,495,369 B1 | 12/2002 | Kercso et al. | |
| 6,558,623 B1 | 5/2003 | Ganz et al. | |
| 6,734,424 B2 * | 5/2004 | Lennon et al. ............. 250/288 |
| 6,846,456 B2 | 1/2005 | Acosta et al. | |
| 6,982,063 B2 | 1/2006 | Hamel et al. | |
| 2001/0008615 A1 | 7/2001 | Little et al. | |

(Continued)

FOREIGN PATENT DOCUMENTS

EP 0253685 1/1988

(Continued)

OTHER PUBLICATIONS

Andersen, Gregers Rom et al "A Spreadsheet Approach to Automated Protein Crystallization" J. Appl. Cryst. (1996) vol. 29, 236-240.

(Continued)

*Primary Examiner*—Felisa Hiteshew
(74) *Attorney, Agent, or Firm*—David J. Weltz

(57) ABSTRACT

A method is provided that comprises having a trial generation station generate crystallization trials in a crystallization plate transporting the crystallization plate to an imaging station; and having the imaging station take images of the crystallization trials within 30 minutes of the formation of the crystallization trials; wherein the method is performed in a single automated system.

11 Claims, 19 Drawing Sheets

U.S. PATENT DOCUMENTS

| | | |
|---|---|---|
| 2003/0000597 A1 | 1/2003 | Ganz et al. |
| 2003/0022380 A1 | 1/2003 | Jakubowicz et al. |
| 2003/0026732 A1 | 2/2003 | Gordon et al. |
| 2003/0026738 A1 | 2/2003 | Everett |
| 2003/0124735 A1 | 7/2003 | Nanthakumar et al. |
| 2004/0258203 A1 | 12/2004 | Yamano et al. |
| 2005/0025673 A1 | 2/2005 | Shimei |
| 2005/0232822 A1 | 10/2005 | Reed et al. |
| 2006/0057029 A1 | 3/2006 | Coassin et al. |

FOREIGN PATENT DOCUMENTS

| | | |
|---|---|---|
| WO | WO 93/07311 | 4/1993 |
| WO | WO 99/04361 | 1/1999 |
| WO | WO 02/093139 A2 | 11/2002 |

OTHER PUBLICATIONS

Cox, Jane M. et al. "Experiments with Automated Protein Crystallization" J. Appl. Cryst. (1987) vol. 20, pp. 366-373.

Eickhoff, Holger et al. Webpage: "An Automated Platform for Miniaturized Protein Crystallization", Greiner Bio-One (Abstact)(2001), 1 page.

Hosfield, David et al. "A fully integrated protein crystallization platform for small-molecule drug discovery" Journal of structural Biology, vol.. 142 (2003) pp. 207-217.

Rubin, Byron et al. "Minimal intervention robotic protein crystallization" Journal of Crystal Growth, vol. 110 (1991) pp. 156-163.

Ward, Keith B. et al. "Automated Preparation of Protein Crystals Using Laboratory Robotics and automated Visual Inspection" Journal of Crystal Growth vol. 90 (1988) pp. 325-339.

* cited by examiner

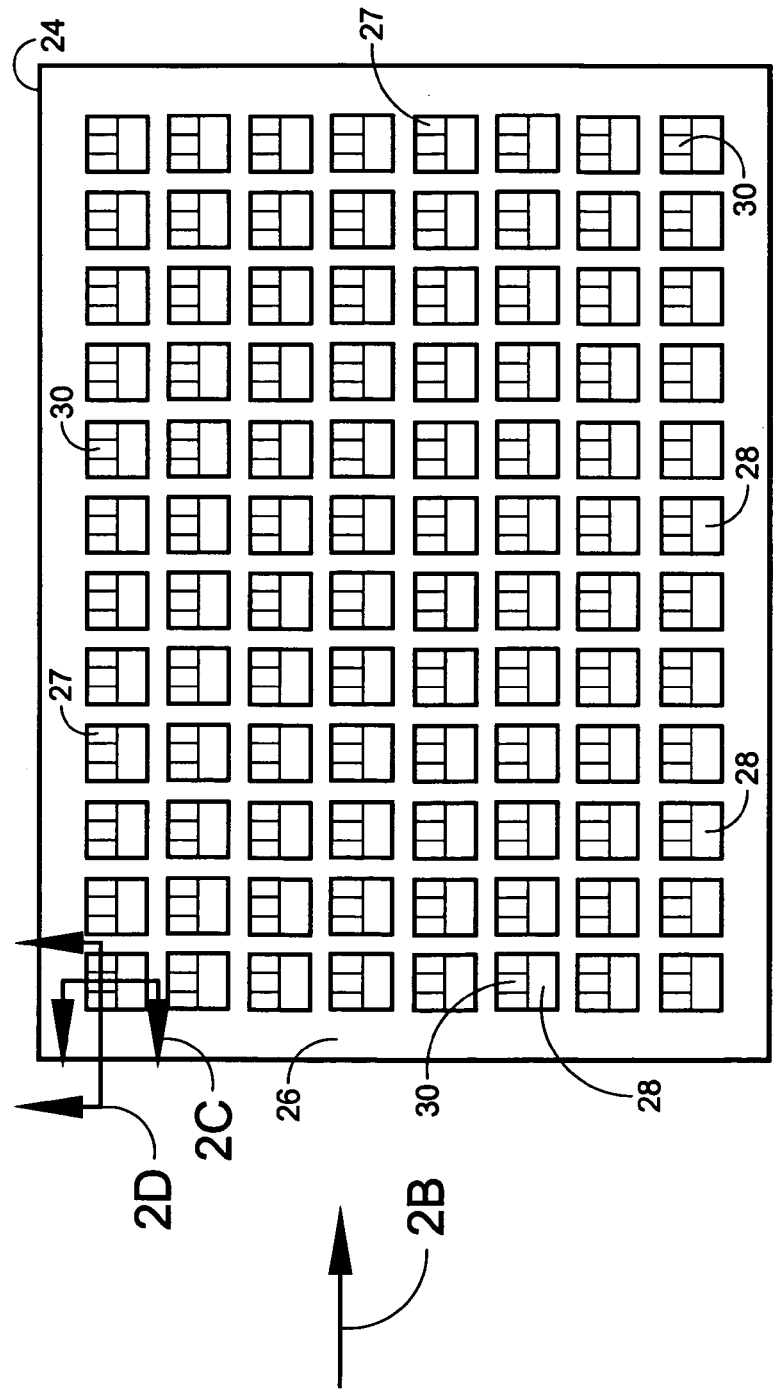
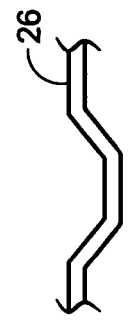
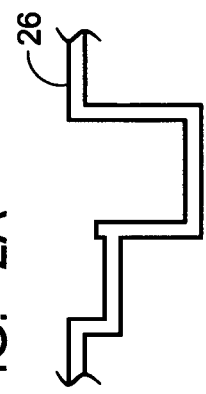
FIG. 2A
FIG. 2C
FIG. 2D
FIG. 2B

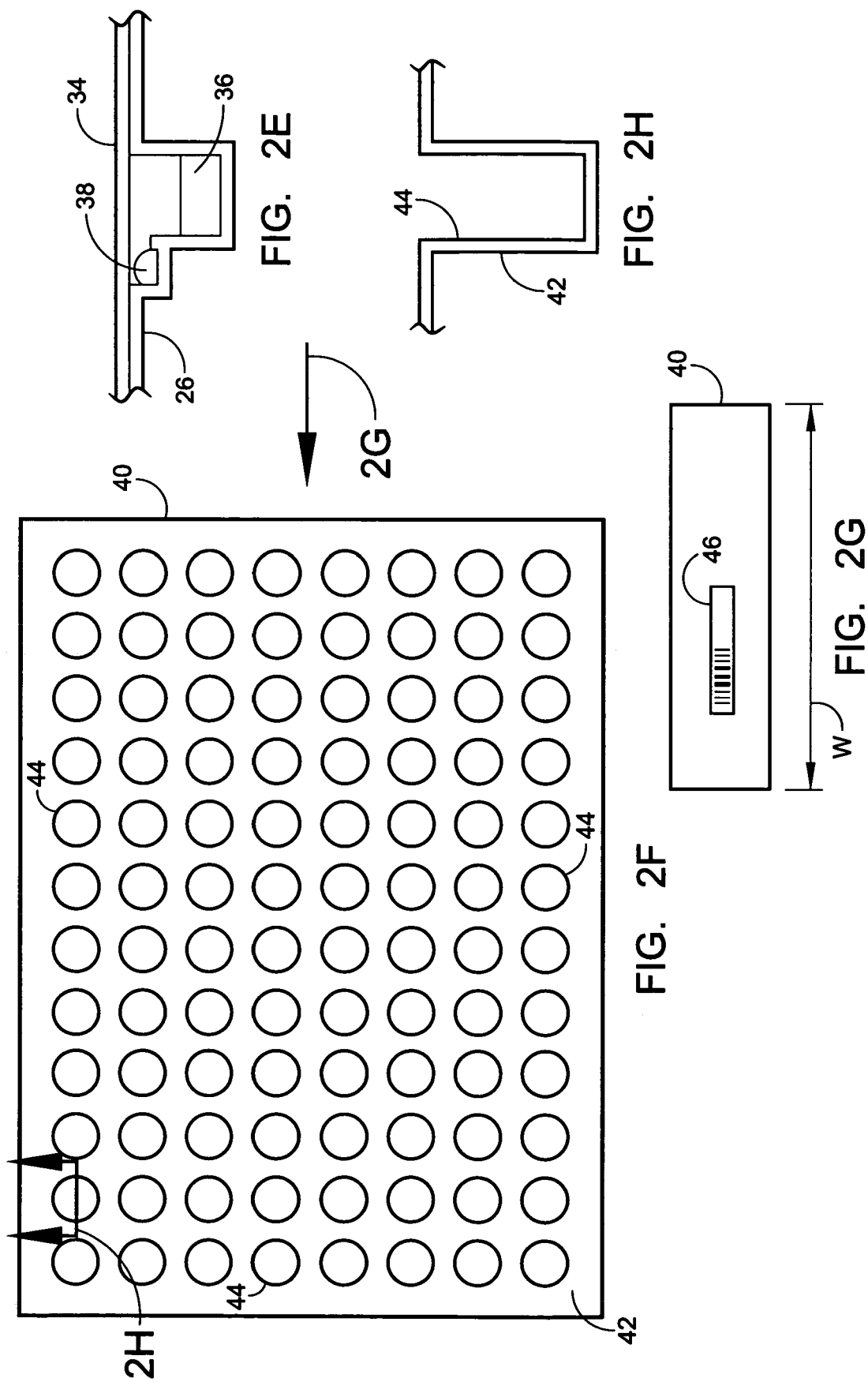

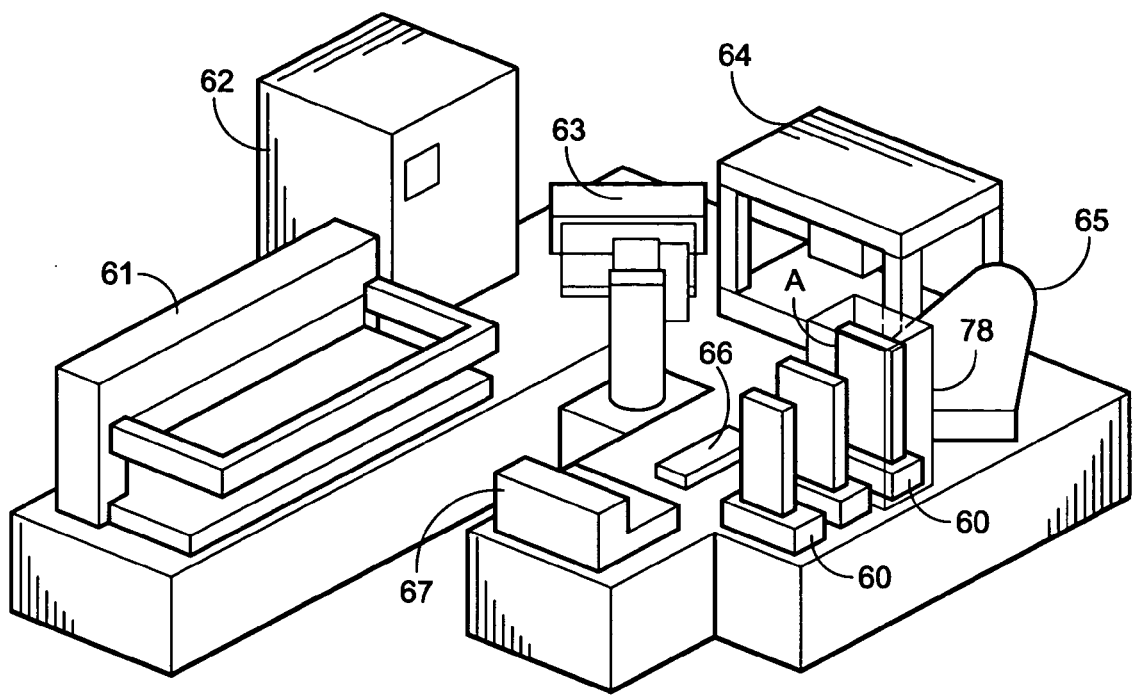
FIG. 3A
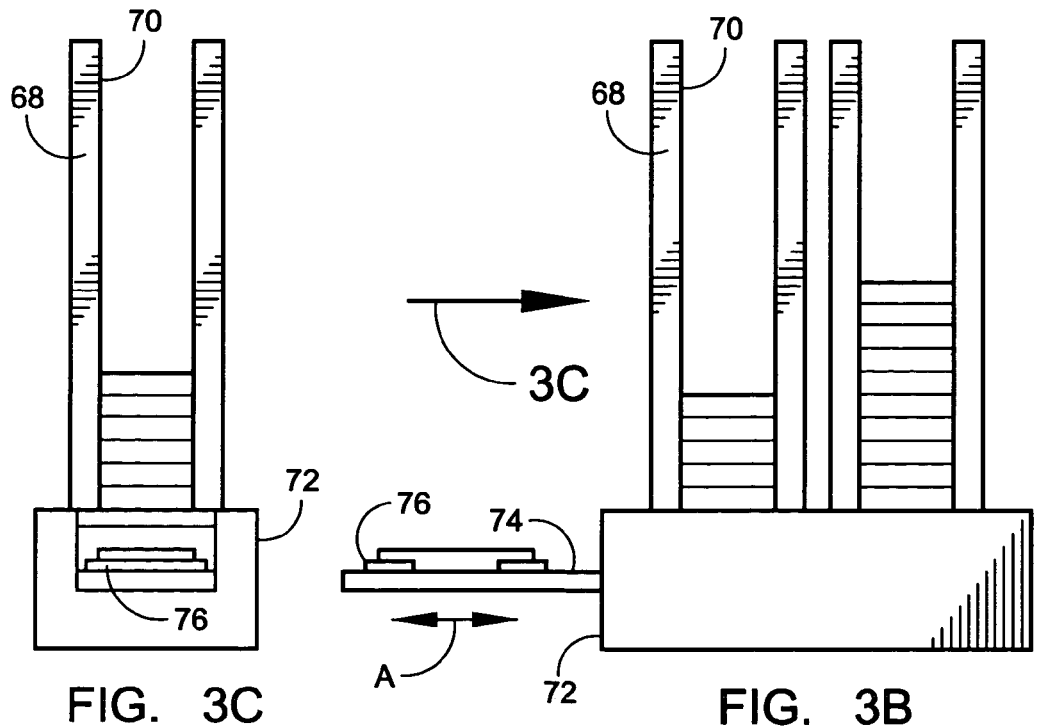
FIG. 3C
FIG. 3B

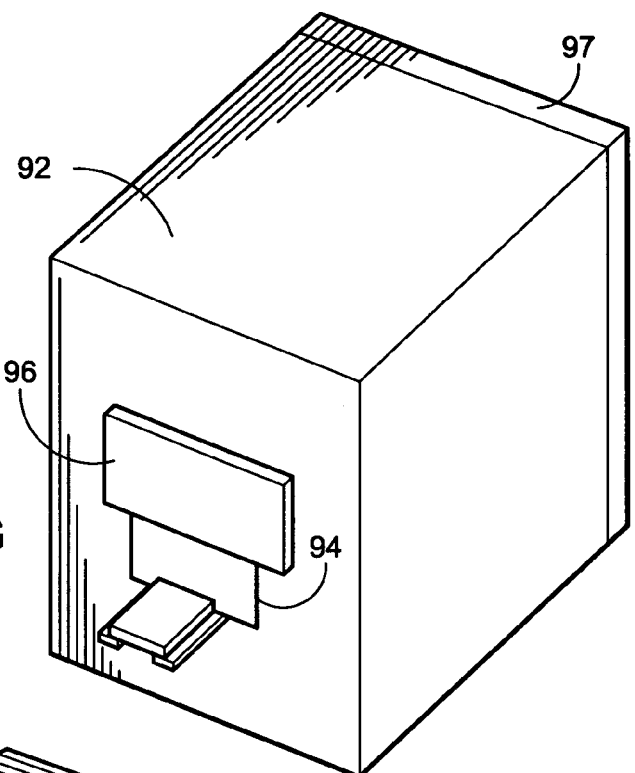
FIG. 3G
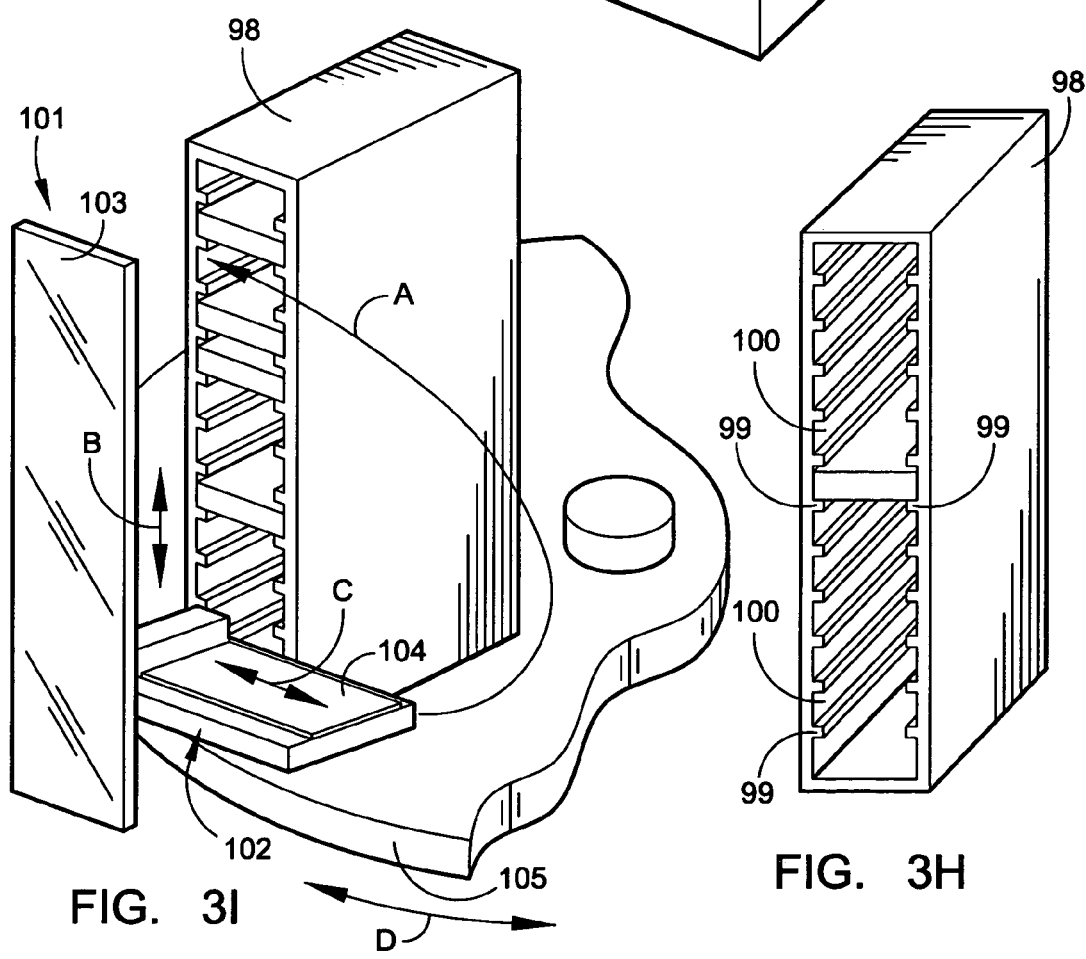
FIG. 3I
FIG. 3H

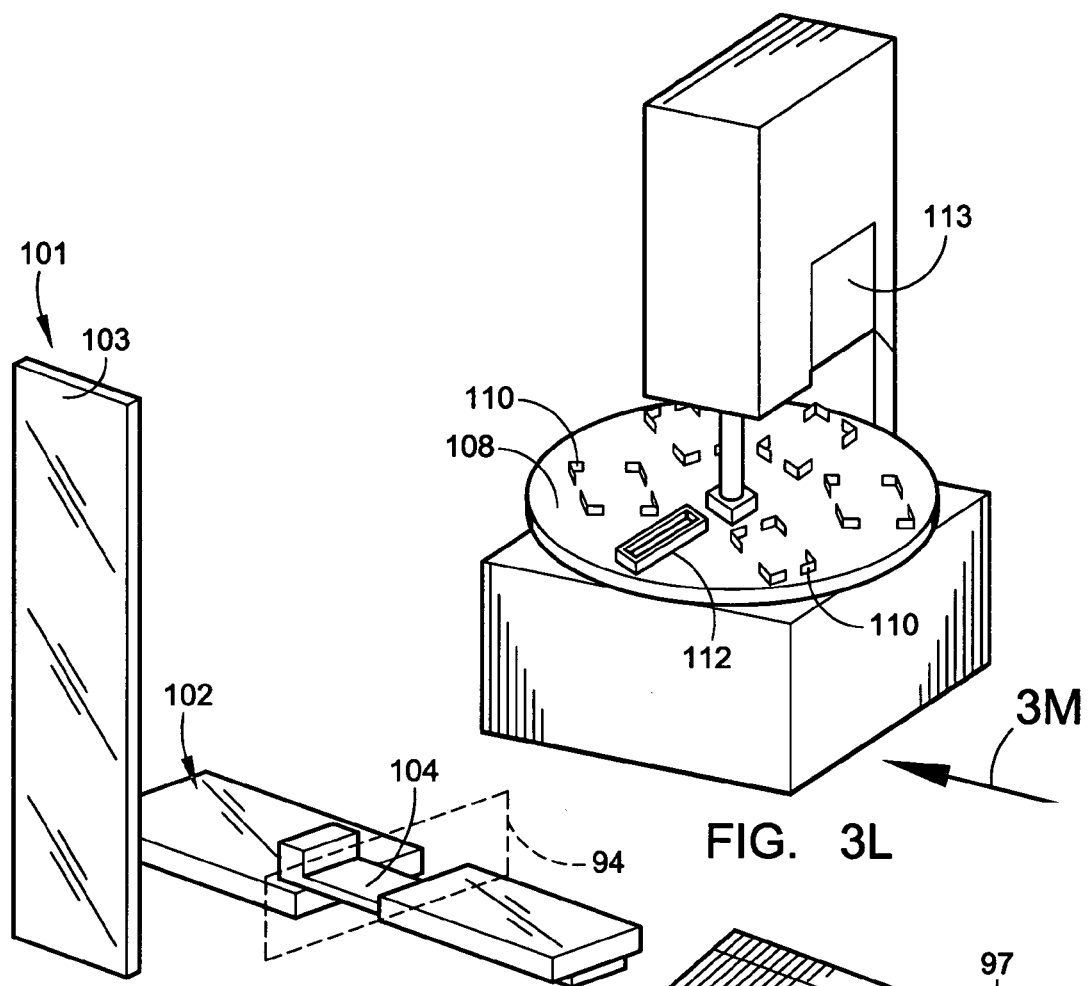
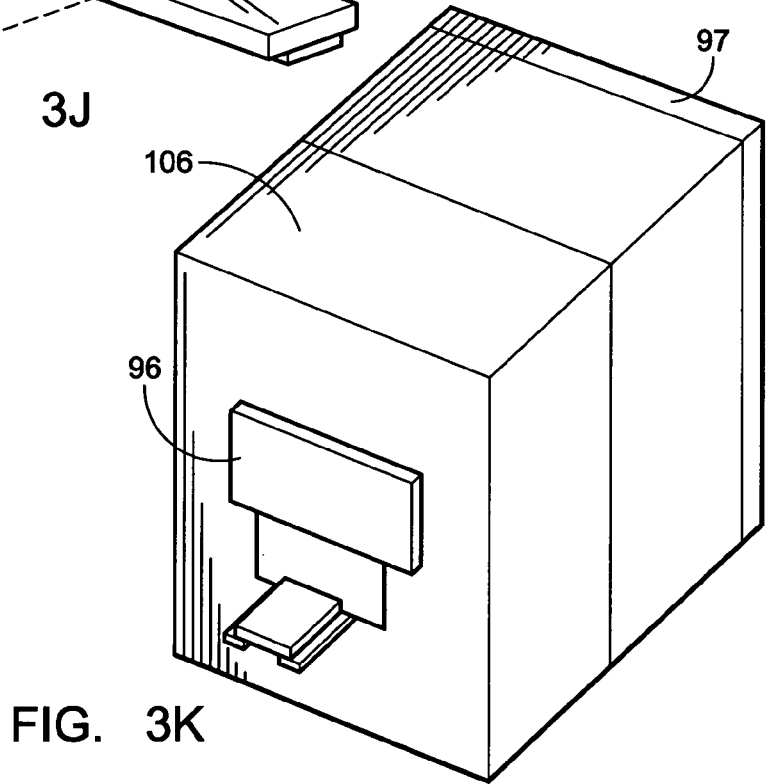
FIG. 3J  FIG. 3K  FIG. 3L

METHOD FOR PERFORMING CRYSTALLIZATION TRIALS

RELATED APPLICATION

This application is a continuation of U.S. application Ser. No. 11/002,005, filed Dec. 1, 2004, which claims the benefit of U.S. Provisional Application No. 60/533,840, filed Dec. 31, 2003, each of which are incorporated herein by reference.

BACKGROUND

1. Field of the Invention

The invention relates to methods and systems for crystallizing molecules and more particularly to methods and systems for automating the crystallization of molecules.

2. Background of the Invention

Structure based drug development has become an important approach to developing new drugs. Structure based drug development relies on the ability to determine the three-dimensional structure of proteins with the crystallization of proteins being an essential step in determining their three-dimensional structures.

Molecules are generally crystallized by precipitating the molecule out of a solution. However, the process of growing high quality crystals involves trial-and-error with multiple solution variables such as pH, temperature, ionic strength, specific concentrations of salts, precipitants and detergents. As a result, many solutions must be tried in order to identify appropriate crystallization conditions. The preparation and manipulation of these solutions and the interpretation of the results is labor intensive. The use of human workers during this process is the most common source of errors and is often a large portion of the costs associated with crystallization trials.

A need exists for improved systems for crystallizing molecules and in particular proteins and other biological macromolecules.

SUMMARY OF THE INVENTION

A system is disclosed for generating a plurality of crystallization trials in a crystallization plate. The crystallization trials can be employed to test different solutions for their ability to crystallize a molecule. A crystallization trial includes a mother liquor and a crystallization sample which contains the molecule to be crystallized. The system employs storage plates to store screen solutions. The system employs these screen solutions in preparing the mother liquors and the samples in a crystallization plate. The screen storage plates are configured to hold sufficient screen solution to prepare mother liquor and samples in a plurality of crystallization plates. Accordingly, the system can prepare a plurality of crystallization plates from a single screen storage plate. The system can further include a screen storage station where screen storage plates can be stored between uses. The use of the screen storage station can reduce the need for human preparation and manipulation of the screen solutions and can accordingly reduce errors and labor requirements and can increase the accuracy of results.

One embodiment of the system includes a screen generation station configured to generate a screen storage plate that contains screen solutions. The system also includes a transport mechanism configured to transport the screen storage plate from the screen generation station to a screen storage station. The screen storage station includes a housing configured to house a plurality of screen storage plates. The screen storage station also includes mechanics for retrieving a selected screen storage plate from among the plurality of screen storage plates for transport to another station. Further, the system includes a controller. The controller includes logic for causing the screen generation station to generate a screen storage plate that contains the screen solutions, logic for causing the transport mechanism to transport the screen storage plate to the screen storage station, logic for causing the screen storage station to store the screen storage plate among the plurality of screen storage plates and logic for causing the screen storage station to retrieve the selected screen storage plate from among the plurality of screen storage plates.

Another variation of the system includes a screen storage station. The screen storage station includes a housing configured to store a plurality of screen storage plates. The screen storage station further includes mechanics for retrieving a selected screen storage plate from among the plurality of screen storage plates. The system also includes a transport mechanism configured to transport the selected screen storage plate to a screen replicator. The screen replicator includes a transfer mechanism configured to transfer portions of different screen solutions contained in the selected screen storage plate to well regions of a crystallization plate. The system further includes a controller. The controller includes logic for causing the screen storage station to retrieve the selected screen storage plate from among the plurality of screen storage plates, logic for causing the transport mechanism to transport the selected screen storage plate from the screen storage station to the screen replicator, and logic for causing the screen replicator to transfer portions of different screen solutions from the selected screen storage plate to the wells of the crystallization plate.

Another variation of the system includes a screen replicator configured to transfer screen solutions from wells of a screen storage plate into wells of multiple crystallization plates. The system also includes a transport mechanism configured to transport crystallization plates from the screen replicator to a trial generation station. The trial generation station is configured to generate crystallization trials in a crystallization plate. The system further includes a controller. The controller includes logic for causing the screen replicator to transfer the screen solutions from the screen storage plate to multiple crystallization plates, logic for causing the transport mechanism to transport multiple crystallization plates from the screen replicator to the trial generation station and logic for causing the trial generation station to generate crystallization trials in the crystallization plates.

Another variation of the system includes a trial generation station configured to generate crystallization trials in a crystallization plate. The system further includes a transport mechanism configured to transport a crystallization plate having the crystallization trials to an imaging station. The imaging station is configured to generate images of the crystallization trials in the crystallization plate.

Another variation of the system includes a trial generation station configured to generate crystallization trials in wells of a crystallization plate. The system also includes a transport mechanism configured to transport the crystallization plate to an imaging station. The imaging station is configured to take images of the crystallization trials in the crystallization plate. The system also includes a controller including logic for causing the trial generation station to generate crystallization trials in the crystallization plate, logic for causing the transport mechanism to transport the crystallization plate to the imaging station and for causing the imaging station to take images of the crystallization trials in the crystallization plate within a desired period of time following the formation of the crystallization trials. In some instances, the logic causes the imaging station to take images of the crystallization trials within 30 minutes of forming the crystallization trials, within 15 minutes of forming the crystallization trials, or within 5 minutes or 2 minutes of forming the crystallization trials. In one example, the logic causes the imaging station to take images of the crystallization trials within 1 minute of forming the crystallization trials and optionally within 30 seconds or less of forming the crystallization trials.

An embodiment of a trial generation station is also disclosed. The station includes a deck configured to receive a crystallization plate from a transport mechanism. The station also includes a dispensing head configured to be moved relative to the stage. The dispensing head includes a plurality of primary fluid dispensers and one or more secondary fluid dispensers. At least one of the secondary fluid dispensers is laterally immobilized relative to one or more of the primary fluid dispensers. The crystallization plate includes a plurality of trial zones where crystallization trials are conducted. Each trial zone includes a well region associated with a sample region. Each primary fluid dispenser is configured to transfer a portion of a mother liquor from a well region of a trial zone to the sample region associated with the trial zone. The one or more secondary fluid dispensers are configured to dispense a molecule solution into the sample regions of the trial zones. The molecule solution includes the molecule to be crystallized.

A method of operating a crystallization system is also disclosed. An embodiment of the method includes generating a screen storage plate containing screen solutions screen solutions at a screen generation station. The method also includes having a transport mechanism transport the screen storage plate from the screen generation station to a screen storage station. The method further includes storing the screen storage plate in the screen storage station among a plurality of screen storage plates. The method additionally includes having the screen storage station retrieve a selected screen storage plate from among the plurality of screen storage plates stored within the screen storage station.

Another embodiment of the method includes identifying a screen storage plate from among the plurality of screen storage plates stored in a screen storage station. Each of the stored screen storage plates includes a plurality of wells that contain a screen solution. At least a portion of the stored screen storage plates have a selection of screen solutions that is different from the selection of screen solutions held in other screen storage plates. The method also includes having a transport mechanism transport the identified screen storage plate to a screen replicator and transport a crystallization plate to the screen replicator. The method further includes having the screen replicator transfer screen solutions from the identified screen storage plate to the crystallization plate.

Another embodiment of the method includes storing a plurality of screen storage plates in a screen storage station. The method also includes having the screen storage station retrieve a selected screen storage plate from among the plurality of screen storage plates stored within the screen storage station. The method further includes having a transport mechanism transport the selected screen storage plate to a screen replicator. The method additionally includes having a transfer mechanism of a screen replicator transfer portions of different screen solutions from the retrieved screen storage plate to wells of a crystallization plate.

Another variation of the method includes having a screen replicator transfer screen solutions from wells of a screen storage plate into wells of one or more crystallization plates. The method also includes having a transport mechanism transport the crystallization plate from the screen replicator to a trial generation station. The method further includes having the trial generation station generate crystallization trials in the wells of the crystallization plate.

Another variation of the method is performed in a single, automated system. The method includes transferring screen solutions from wells of a screen storage plate to wells of a plurality of crystallization plates. The method further includes transporting the crystallization plates to a trial generation station. The method additionally includes generating crystallization trials in the crystallization plates transported to the trial generation station.

Another variation of the method includes having a trial generation station generate crystallization trials in a crystallization plate. The method also includes transporting the crystallization plate to an imaging station and having the imaging station take images of the crystallization trials within 30 minutes of the formation of the crystallization trials. In some instances, the images of the crystallization trials are taken within 15 minutes of forming the crystallization trials, within 5 minutes of forming the crystallization trials or within 2 minutes of forming the crystallization trials. In one example, images of the crystallization trials are taken within 1 minute of forming the crystallization trials or within 30 seconds of forming the crystallization trials.

BRIEF DESCRIPTION OF THE FIGURES

FIG. 1A is a block diagram of a crystallization system. The system includes a controller configured to control a plurality of stations and to control a transport mechanism. The transport mechanism is configured to transport plates between the stations. Each station can perform one or more operations on the plate. The stations can be selected such that the transport mechanism can grasp an empty plate and sequentially transport that plate to a series of stations until crystallization trials are formed in wells of the plate.

FIG. 1B is a diagram illustrating resources employed by the system and outputs provided by the system.

FIG. 1C illustrates relationships between a plurality of different solutions that are employed by the system and a plurality of different plates that are employed by the system.

FIG. 2A through FIG. 2N illustrate plates that are employed by the system.

FIG. 2A through FIG. 2E illustrate a crystallization plate (CP) that is suitable for use with the system. The CP includes a support structure that defines a plurality of trial zones in the CP.

FIG. 2A is a top view of the CP.

FIG. 2B is a side view of the CP shown in FIG. 2A taken looking in the direction of the arrow labeled 2B.

FIG. 2C illustrates a cross section of the CP shown in FIG. 2A taken along the line labeled 2C.

FIG. 2D illustrates a cross section of the CP shown in FIG. 2A taken along the line labeled 2D.

FIG. 2E illustrates a trial zone with a crystallization trial.

FIG. 2F through FIG. 2H illustrate a screen storage plate (SSP) that is suitable for use with the system. The SSP includes a support structure that defines a plurality of wells (SSP wells) in the screen storage plate.

FIG. 2F is a top view of the SSP.

FIG. 2G is a side view of the SSP shown in FIG. 2F taken looking in the direction of the arrow labeled 2G.

FIG. 2H is a cross section of the SSP shown in FIG. 2F taken along the line labeled 2H.

FIG. 2I is a bottom view of the cover.

FIG. 2J is a cross section of the cover shown in FIG. 2I taken along the line labeled 2J.

FIG. 2K illustrates the cover positioned on the SSP.

FIG. 2M and FIG. 2N illustrate a plate suitable for use as a molecule plate (TM plate) or as an additive plate. The plate includes a support structure that defines a plurality of wells.

FIG. 2M is a top view of the plate.

FIG. 2N illustrates a cross section of the plate shown in FIG. 2M taken along the line labeled 2N.

FIG. 3A is a perspective view of a system that includes a selection of stations.

FIG. 3B through FIG. 3AA independently illustrate each of the stations shown in FIG. 3A.

FIG. 3B and FIG. 3C illustrate a storage structure that is suitable for use as a primary CP storage station and/or as a secondary CP storage station.

FIG. 3B is a side view of the storage structure.

FIG. 3C is a side view of the storage structure shown in FIG. 3B taken looking in the direction of the arrow labeled 3C.

FIG. 3D is a perspective view of the screen generation station.

FIG. 3E is a side view of the screen generation station shown in FIG. 3D taken looking in the direction of the arrow labeled 3E.

FIG. 3F is a side view of the screen generation station shown in FIG. 3D taken looking in the direction of the arrow labeled 3F.

FIG. 3G through FIG. 3K illustrate a screen storage station that is suitable for storing screens and libraries of screen.

FIG. 3G is a perspective view of the outside of the screen storage station. The screen storage station includes a container with a service opening through which SSPs can be passed.

FIG. 3H is a perspective view of a housing configured to house SSPs in the container.

FIG. 3I illustrates housing in conjunction with mechanics located in the container.

FIG. 3J also illustrates housing in conjunction with mechanics located in the container.

FIG. 3K illustrates a screen storage device that includes a covering device configured to place a cover on an SSP being positioned in the screen storage station and to remove a cover from an SSP being removed from the screen storage station.

FIG. 3L through FIG. 3N illustrate an embodiment of a screen replicator suitable for use with the crystallization system.

FIG. 3L is a perspective view of the screen replicator.

FIG. 3M is a side view of the screen replicator shown in FIG. 3L taken looking in the direction of the arrow labeled 3M.

FIG. 3N is a top view of the screen replicator shown in FIG. 3L.

FIG. 3O is a perspective view of the trial generation station.

FIG. 3P is a side view of the trial generation station shown in FIG. 3O taken looking in the direction of the arrow labeled 3P. The trial generation station includes a head that can be moved vertically as shown by the arrow labeled V in FIG. 3O and laterally as shown by the arrows labeled L in FIG. 3O.

FIG. 3Q through FIG. 3S illustrate a suitable construction of a head for use with the trial generation station.

FIG. 3Q is a perspective view of the head.

FIG. 3R is a side view of the head shown in FIG. 3Q taken in the direction of the arrow labeled 3R.

FIG. 3S is a side view of the head shown in FIG. 3Q taken in the direction of the arrow labeled 3S.

FIG. 3W is a perspective view of the robotic arm.

FIG. 3X is a top view of the functional end of the robotic arm shown in FIG. 3W.

FIGS. 3Y through 3AA illustrate examples of suitable placeholders for use with the above stations.

FIG. 3Y is a perspective view of a placeholder including a plurality of ridges extending from a platform.

FIG. 3AA is a perspective view of a placeholder that includes a recess extending into a platform.

FIG. 4A illustrates an example of an SSP tracking database that can be employed by the controller. The SSP tracking database stores data for a plurality of SSPs. For each SSP in the database, the SSP tracking database associates an SSP identifier with an SSP location identifier and a screen identifier.

FIG. 4B illustrates an example of a CP tracking database that can be employed by the controller. The CP tracking database stores data for a plurality of CPs. For each CP in the database, the SSP tracking database associates a CP identifier with a CP location identifier.

FIG. 4C illustrates an example of a screen generation database that can be accessed by the controller. The screen generation database associates screen identifiers with screen recipes.

FIG. 5A illustrates a method of operating the system so as to generate a screen library that is stored in the screen storage station.

FIG. 5B illustrates a method of operating the system so as to prepare a CP having crystallization trials.

DETAILED DESCRIPTION

Figure 1A:
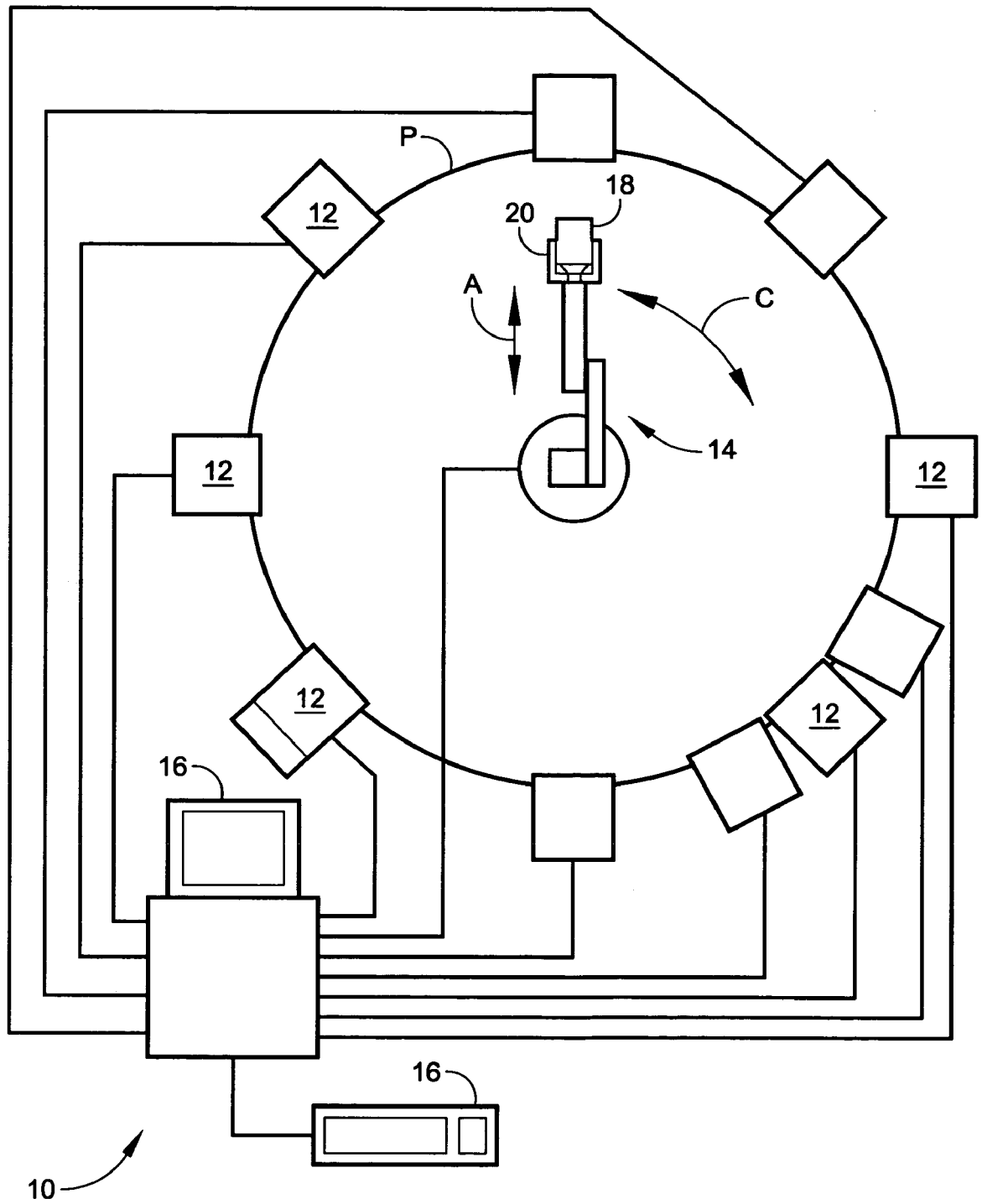
FIG. 1A through FIG. 1C are generalized diagrams illustrating a crystallization system for generating crystallization trials.

A system for generating crystallization trials in a crystallization plate is disclosed. A crystallization trial includes a mother liquor and a crystallization sample that contains the molecule to be crystallized by the system. The system employs screen solutions that can serve as the mother liquors in the crystallization trials. These screen solutions are stored in screen storage plates.

The system can include a screen generation station configured to generate each screen solution from one or more component solutions. The screen generation station positions the screen solutions in the wells of a screen storage plate. The system can also include a transport mechanism configured to transport the screen storage plate from the screen generating station to a screen storage station where a plurality of the screen storage plates can be stored.

The selection of screen solutions in a screen storage plate is called a screen. The screen generation station and the screen storage station can be employed to generate a screen library. For instance, many of the screens that are employed during operation of the system are used repeatedly. As a result, the system can be used to generate these screens at the screen storage station and then store them in the screen storage station for later use. Further, it can be desirable to have a screen customized for some purpose on hand. The system can be used to generate customized screens at the screen storage station and store them in the screen storage station for later use. The selection of the screens stored in the screen storage station serves as a screen library that can be used during subsequent operation of the system.

The screen storage station can also include mechanics for retrieving a particular screen storage plate from among the screen storage plates stored in the screen storage station. The system can employ a transport mechanism to transport the retrieved screen storage plate to a screen replicator. The screen replicator can transfer the screen solutions from the screen storage plate to one or more crystallization plates. After transfer of the screen solutions, the transport mechanism can return the screen storage plate to the screen storage station. At a later time, the system can transport the screen storage plate from the screen storage station back to screen replicator and the screen replicator can transfer the screen solutions to one or more other crystallization plates. Each of the crystallization plates includes a plurality of crystallization zones where crystallization trials are conducted. Accordingly, the screen solutions in a screen storage plate can be used to generate the crystallization trials in more than one crystallization plate. As a result, the system can allow an operator to avoid the need to generate new screen solutions for each crystallization plate.

The use of a particular set of screen solutions with multiple crystallization plates can provide for results verification. For instance, it may be desirable to determine whether the results in a particular crystallization plate are correct or are repeatable. The system can generate another set of crystallization trials employing the same screen solutions. For instance, the system can return to the screen storage station and retrieve the same screen storage plate from which the original screen solutions were transferred. The system can use the screen solutions in that screen storage plate to generate new crystallization trials. As a result, new crystallization trials can be generated under conditions similar to the original crystallization trials. The results of the new crystallization trials and the original crystallization trials can then be compared to verify the results.

The system can also include a trial generation station. A transport mechanism can transport a crystallization plate that includes screen solutions from the screen replicator to the trial generation station. The trial generation station can employ the screen solutions to generate crystallization trials in the crystallization plate. The trial generation station can also be configured to add one or more additives to one or more of the screen solutions before generating the crystallization trials. A variety of additives can be employed. For instance, the integrity of the additive may be all or partially lost if stored under the same conditions as the screen solutions. Further, the additive may be most effective when used at different conditions than the screen solution. For instance, the additive may be most effective if added to screen solutions at a different temperature than the screen solution.

Examples of suitable additives include additives that may enhance crystallization and/or freezing, may cause co-crystallization and/or may associate or bind to active sites on the molecule to be crystallized.

The system can include an imaging station. A transport mechanism can transport a crystallization plate that includes crystallization trials to the imaging station. The imaging station can generate images of the crystallization trials. In some instances, the images of the crystallization trials are taken within 30 minutes of forming the crystallization trials, within 15 minutes of forming the crystallization trials, within 5 minutes of forming the crystallization trials or within 2 minutes of forming the crystallization trials. In one example, images of the crystallization trials are taken within 1 minute of forming the crystallization trials or within 30 seconds of forming the crystallization trials.

Reducing the time between generation of the crystallization trials and generation of initial images of the trials can provide useful additional information about the trial results. For example, salts tend to crystallize earlier than molecules such as proteins. Hence, a crystallization trial that quickly forms a crystal is more likely a salt than a protein. As a result, an early image of a crystallization trial can reduce the need to perform additional analysis of crystals to determine whether the crystal is a salt or a crystal of the molecule for which the crystallization trial is directed, such as a protein. Additionally or alternately, the imaging station can be employed to generate images of a crystallization trial over time to track the progress of the crystallization trial.

A suitable transport mechanism for use with the system includes a robotic arm configured to pick up a plate from one of the stations in the system and transport the plate to one or more other stations in the system. Accordingly, the robotic arm can transport a plate to a series of stations. An advantage of a robotic arm is the ability to transport one plate to a series of stations and to transport another plate to the series of stations in a different order or to transport the plate to a different series of station. In contrast, transport mechanisms such as conveyor type devices transport each plate past the same series of station in the same order. As a result, a robotic arm can enhance the flexibility of the system.

The system can be employed with a wide range of molecules. In one variation, the molecule is a molecule such as a protein for which an x-ray crystal structure is needed. Determining high-resolution structures of molecules can be used to accelerate drug development. The molecule to be crystallized may also be a molecule for which a crystalline form of the molecule is needed. For instance, it may be desirable to create a crystalline form of a molecule or to identify a new crystalline form of a molecule. In some instances, particular crystalline forms of a molecule may be more bioactive, dissolve faster, decompose less readily and/or be easier to purify.

The molecule is preferably a macromolecule. The molecule preferably has a molecule weight of at least 500 Daltons, more preferably of at least 1000 Daltons, although smaller molecular weight molecules may also be crystallized. Of particular interest are macromolecules such as proteins because information from these crystallizations can be employed in the effective design of new drugs.

The system can employ small sample volumes and/or small mother liquor volumes. Although larger sample volumes can be used, the sample can be prepared so as to have a volume less than about 1 µL and more preferably less than about 500 nL. Reducing the volume of the sample can increase the rate of crystal formation. Further, reducing the sample volume reduces the amount of molecule to be crystallized that is required for the crystallization experiments. Reducing the required amount of molecule can be particularly advantageous when the molecule is a protein because it reduces the substantial time and cost requirements associated with generating larger amounts of protein.

Decreasing the sample volume can also reduce the volume of the mother liquor that is required in crystallization trials. Although larger volumes can be employed, the volume of mother liquor left in the well region after preparation of the sample can be less than about 500 µL and more preferably less than about 300 µL. Decreasing the volume of the well regions can reduce the size of the trial zones and can accordingly allows the density of trial zones on a crystallization plate to be increased.

In some instances, the stations included in the system are selected such that one or more transport mechanism can take an empty crystallization plate and move that crystallization plate from one station to another until crystallization trials are formed in the crystallization plate. As a result, the system can take an empty crystallization plate as an input and provide crystallization plates with crystallization experiments as an output. Accordingly, the system can reduce the labor requirements associated with generating crystallization trials. Reduction of labor requirements can further reduce errors and costs associated with the generation of crystallization trials.

Systems according to the present invention will now be described with regard to the figures.

FIG. 1A is block diagram of a crystallization system. The system includes a controller 10 configured to control a plurality of stations 12 and to control a transport mechanism 14. Suitable controllers 10 includes, but are not limited to, PCs and computer workstations. The controller 10 can include one or more operator interfaces 16 that allow a system operator to input information into the system and/or extract information from the system. Suitable operator interfaces 16 include, but are not limited to, monitors, keyboards, mice, and touch screens.

The transport mechanism 14 is configured to transport a plate 18 from one station 12 to one of a plurality of the other stations 12. The illustrated transport mechanism 14 includes a robotic arm. The robotic arm includes a functional end configured to grasp and release the plates 18. Examples of plates 18 for use with the system include, but are not limited to, screen storage plates (SSPs) and crystallization plates (CPs). A suitable CP includes a plurality of trial zones where crystallization trials are conducted. Each trial zone includes a well region associated with a sample region. The well region is configured to hold a mother liquor and the sample region is configured to hold a sample that contains the molecule to be crystallized. An SSP is a multiwell plate that includes a plurality of SSP wells that are each configured to hold a screen solution. The structure and function of these plates is described in more detail below in the context of FIG. 2A through FIG. 2K.

The controller 10 controls movement of the transport mechanism 14 within a perimeter labeled P. The functional end can be moved in a direction toward and away from the perimeter as illustrated by the arrow labeled A. Additionally, the functional end can be moved in an arc as illustrated by the arrow labeled C. In some instances, the functional end can also be moved vertically in and out of the page.

The stations 12 are positioned at the perimeter and within the perimeter of the transport mechanism 14 such that the transport mechanism 14 has access to each of the stations 12. For instance, the transport mechanism 14 can transport a plate 18 to and/or from each of the stations 12. Each station 12 is configured to perform one or more operations on one or more plates 18. In some instances, the transport mechanism 14 leaves a plate 18 at a station 12 while the station 12 performs one or more operations on the plate 18. The transport mechanism 14 can perform other operations and return to the station 12 at a later time to pick up the plate 18.

In some instances, the stations 12 are selected such that the transport mechanism 14 can grasp an empty CP and sequentially transport that CP to a series of stations 12 until crystallization trials are formed in the trial zones of a CP. The stations 12 include a plurality of CP storage stations. Each CP storage station can serve as a primary CP storage station where empty CPs are stored before use by the system or as a secondary CP storage station where CPs are stored after full or partial processing by the system.

The stations 12 also include a screen generation station configured to generate a screen storage plate (SSPs) having wells (SSP wells) that contain screen solutions. Suitable screen generation stations are configured to generate the screen solutions and/or to position the screen solutions in the SSP wells. In some instances, the screen generation station is configured to generate the screen solutions in the SSP wells. The stations 12 also include a screen storage station where SSPs that contain screen solutions can be stored. The stations 12 also include a screen replicator where screen solutions are transferred from an SSP into the well regions of a crystallization plate (CP). The transferred screen solution can serve as the mother liquor in the well region or can be a component of the mother liquor in the well region. In some instances, the screen solutions are transferred from an SSP into the well regions of a plurality of crystallization plates (CP).

The stations 12 also include a trial generation station configured to generate crystallization trials in a crystallization plate. Suitable trial generation stations are configured to generate crystallization samples and/or to position the samples in crystallization plates. In some instances, the trial generation station is configured to generate the samples in the crystallization plate. During successful crystallization trials, the molecules crystallize in the samples. The samples can be formed by mixing a portion of the mother liquor from the associated well region with a molecule solution that contains the molecule to be crystallized. In some instances, the trial generation station is also configured to add an additive solution to the well regions of one or more of the trial zones before formation of the crystallization samples. Accordingly, the mother liquor in one or more trial zones can include an additive.

The stations 12 also include a sealing station where the crystallization trials are sealed from the atmosphere. In some instances, the sealing station is configured to position a sealing medium over a CP. The stations 12 can also include a mixing station where a CP or an SSP can be agitated to mix the contents of the SSP wells or the contents of the trial zones. The stations 12 can also optionally include an imaging station where images of the crystallization trials in a CP can be generated.

Although each of the stations 12 in FIG. 1A is illustrated as being interfaced with the controller 10, one or more of the stations 12 may not require an interface with the controller 10. For instance, one or more of the stations may perform one or more operations on a plate without input from the controller 10. The operations can be triggered by the placement of a CP or and SSP at a particular location on the station.

Although FIG. 1A illustrates a transport mechanism 14 that includes a robotic arm, other transport mechanisms can be employed. For instance, a conveyor belt can be employed to transport a plate from one station to another station. Further, the system can employ a plurality of transport mechanisms. As an example, the system can employ a second transport mechanism for transporting SSPs between the screen generation station and the screen storage station and/or a third transport mechanism for transporting SSPs between the screen storage station and the screen replicator. Further, the second transport mechanism and the third transport mechanism can be combined into a single transport mechanism.

Figure 1B:
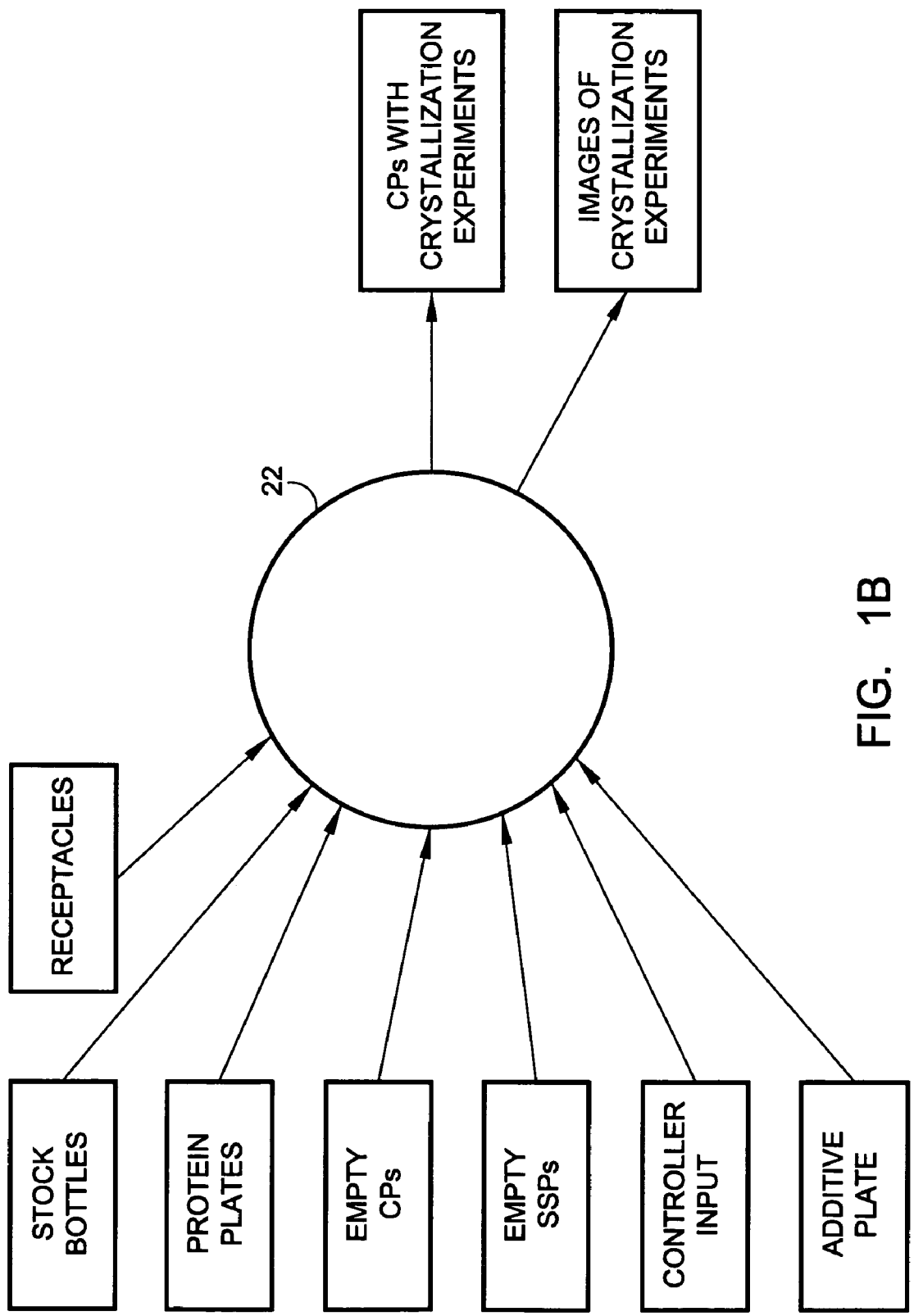

The system manipulates a variety of resources during operation of the system. For instance, the system can manipulates a variety of different plates and a variety of different solutions. FIG. 1B is a diagram illustrating resources employed by the system 22 and outputs provided by the system 22. Empty crystallization plates (CPs) and empty screen storage plates (SSPs) are provided to the system 22. Additionally, bottles and/or receptacles such as test tubes are employed by the system. Each of the bottle and/or receptacle contains a component solution to be used in generating the screen solutions in the SSP wells of an SSP. Each of the component solutions can be prepared outside of the system and/or obtained from an external source.

The molecule to be crystallized is also provided to the system. The molecule can be included in a molecule solution. The molecule solution can be prepared by an operator, by a mechanical device, by a machine or obtained from an outside source. The molecule solution can be provided to the system in a molecule plate. Additionally, the molecule plate can be provided to the system manually, by a mechanical device or by a machine. In some instances, the system also employs an additive that is added to the mother liquor before formation of the crystallization trials. The additive can be included in an additive solution. The additive solution can be prepared by an operator, by a mechanical device, by a machine or obtained from an outside source. The additive solution can be provided to the system in an additive plate. Additionally, the additive plate can be provided to the system manually, by a mechanical device or by a machine.

Data and other information can also be provided to the controller through use of the one or more operator interfaces. For instance, the operator can employ one or more operator interfaces to indicate to the controller which screen is to be used with a particular molecule and/or which additive(s) are to be used with a particular molecule. The system outputs CPs having trial zones with crystallization trials. In some instances, the system also outputs images of the crystallization trials.

Figure 1C:
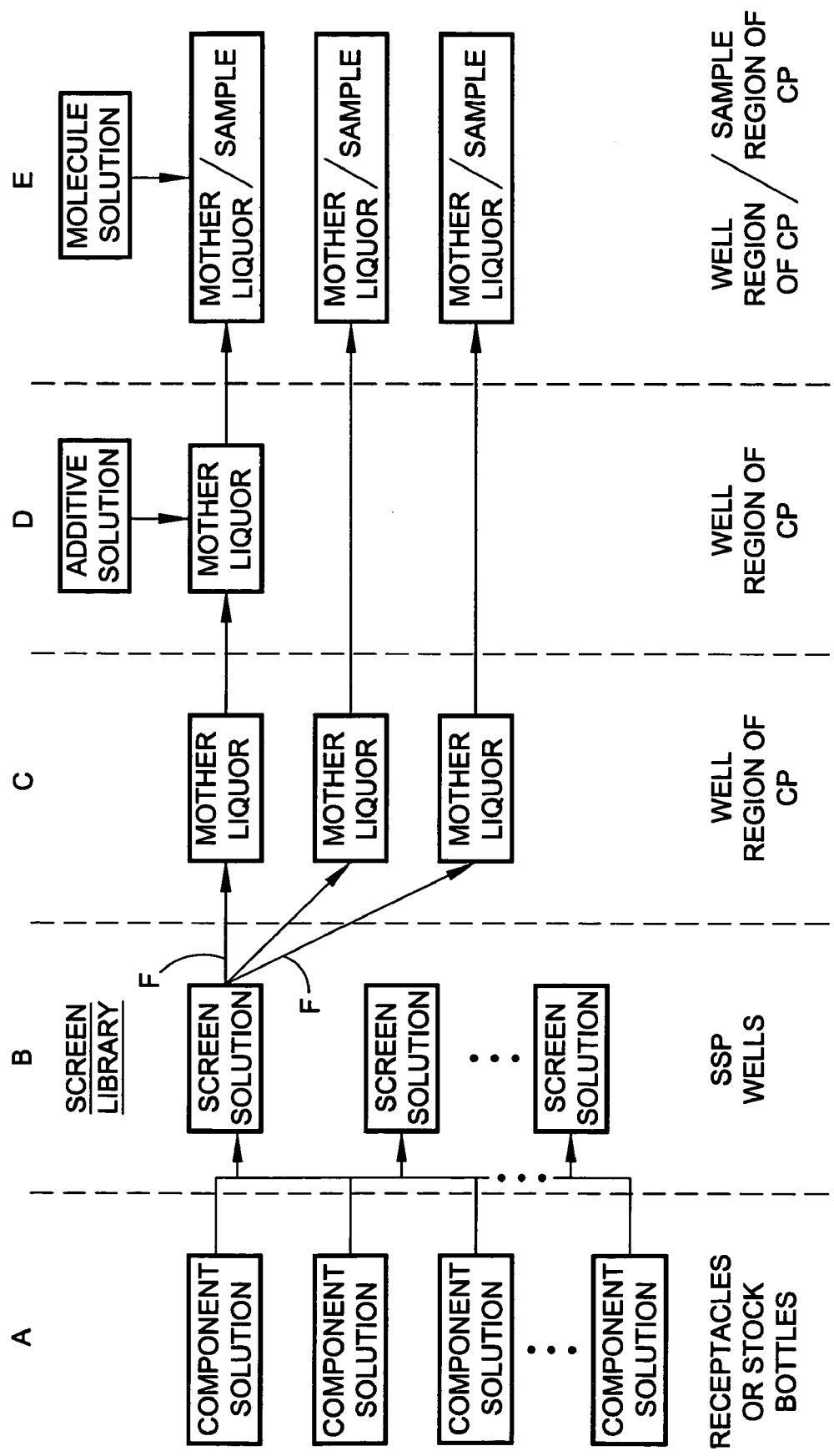

As is evident from the above discussion, a variety of plates and solutions are employed during operations of the system. FIG. 1C is a diagram illustrating the relationships between the solutions and the plates. The dashed lines on the diagram define columns labeled A through E. The arrows illustrate the transfer of a solution from one location to another location. The text positioned at the bottom of each column indicates where the solution is located after the transfer of the solution. The system can include stations that are configured to perform the illustrated solution transfer operations.

The column labeled A shows a plurality of component solutions that are each contained in a receptacle or bottle. The components solutions are employed to prepare screen solutions. As illustrated by the column labeled B, the component solutions are transferred into the SSP wells of an SSP. A single component solution can be delivered into an SSP well or a combination of component solutions can be delivered into one or more SSP wells. The resulting solution in each SSP wells serves as a screen solution. The screen solutions can include other components such as components that are added outside of the system or are added by the system. The screen solutions in two or more SSP wells of the SSP can be the same. In some instances, the screen solution in each SSP well is different.

The initial volume of the screen solutions in the SSP wells can be greater than 200 µL, more preferably volumes greater than 500 µL, more preferably volumes greater than 1 ml, most preferably volumes greater than 3 ml, and/or volumes less than 30 mL, more preferably volumes less than 15 mL, more preferably volumes less than 5 ml and most preferably volumes less than 2.5 mL.

As noted above, the collection of screen solutions in an SSP serves as a screen. The screens can be generated so as to determine the conditions under which a molecule crystallizes. For instance, a coarse screen can be generated and used to generate crystallization trials with a particular molecule. The coarse screen can be a screen that is frequently employed as an initial screen when identifying crystallization conditions. The screen solutions that cause crystal formation can be identified. The identified screen solutions can be employed to generate an optimization screen. The ability to combine component solutions in the generation of a screen solution allows for a wide range of screen solutions that can be employed in an optimization screen. The optimization screen is used to generate crystallization trials with the same molecule. The results of the optimization screen are reviewed to identify the screen solutions that cause crystal formation. Additional optimization screens can be generated until screen solutions providing the desired crystallization conditions are identified. Further details regarding the selection and content of screens is described in U.S. Pat. No. 6,296,673, filed on Jun. 18, 1999, entitled "Method and Apparatus for Performing Array Microcrystallizations" and incorporated herein in its entirety.

The screen solutions are transferred from an SSP into the well regions of a CP as illustrated in the column labeled C. The screen solutions can be transferred such that each screen solution is transferred into a single well region. Although larger volumes can be used, the volume of screen solution transferred into the well regions can be less than about 500 µL, preferably less than about 400 µL, more preferably less than about 250 µL and optionally less than 125 µL. Ranges for the amount of screen solution transferred into the well regions include, but are not limited to, 25 µL to 500 µL, and 25 µL to 300 µL.

The screen solutions can be transferred from an SSP into more than one CP as illustrated by the arrows labeled F. Accordingly, a single SSP can be employed to prepare a plurality of CPs. In some instances, the screen solutions in an SSP can be transferred to more than 5 CPs, more than 25 CPs, more than 50 CPs, more than 100 CPs or more than 200 CPs. In one example, the screen solutions in an SSP are transferred to more than 5 CPs. As a result, a ratio of the initial screen solution volume in the SSP wells to the volume of screen solution transferred into well regions of the CPs can exceed: 200:1, 100:1, 50:1, 25:1 or 5:1.

The screen solution transferred into a well region of a CP can serve as the mother liquor in that well region. Alternately, the screen solution in a well region can combine with other components to form the mother liquor in the well region. An additive solution can be added to one or more well regions of a CP as illustrated in the column labeled D. The additive solution combines with the screen solution to form the mother liquor in that well region.

A sample is prepared in the sample regions of a CP as illustrated in the column labeled E. The sample can be prepared by transferring a portion of the mother liquor from the well regions of the CP to the associated sample regions and by transferring a molecule solution that includes the molecule to be crystallized to the sample region. The molecule solution and the mother liquor combine to form the sample.

Although larger volumes can be used, the volume of mother liquor transferred into the sample regions can be less than about 1 μL, preferably less than about 750 nL of mother liquor, more preferably less than about 500 nL of mother liquor and most preferably less than about 250 nL of mother liquor. In one variation, the volume of the mother liquor transferred into the sample regions is between 1 nL and 1000 nL, preferably between 1 nL and 750 nL, more preferably between 1 nL and 500 nL, more preferably between 1 nL and 250 nL and most preferably between 10 nL and 250 nL.

Although larger volumes can be used, the volume of molecule solution transferred into the sample regions can be less than about 1 μL, preferably less than about 750 nL, more preferably less than about 500 nL and most preferably less than about 250 nL. In one variation, the volume of the molecule solution dispensed into the sample regions is between 1 nL and 1000 nL, preferably between 1 nL and 750 nL, more preferably between 1 nL and 500 nL, more preferably between 1 nL and 250 nL and most preferably between 10 nL and 250 nL.

In some instances, the solutions are transferred into the sample region so as to form a sample having a volume less than about 1 μL, preferably less than about 750 nL, more preferably less than about 500 nL and most preferably less than about 250 nL. In one variation, the sample volume is between 1 nL and 1000 nL, preferably between 1 nL and 750 nL, more preferably between 1 nL and 500 nL, more preferably between 1 nL and 250 nL and most preferably between 10 nL and 250 nL. Further, the solutions can be transferred into and from the well regions such that the volume of mother liquor remaining in the wells after formation of the sample is less than 500 μL of screen solution, preferably less than about 400 μL, more preferably less than about 300 μL and optionally less than 250 μL. Ranges for the amount of screen solution transferred into the well regions include, but are not limited to, 25 μL-500 μL, and 25 μL-300 μL.

FIG. 2A is a top view of a crystallization plate (CP) 24 that is suitable for use with the system. FIG. 2B is a side view of the CP 24 shown in FIG. 2A taken looking in the direction of the arrow labeled 2B. FIG. 2C is a cross section of the CP 24 shown in FIG. 2A taken along the line labeled 2C and FIG. 2D is a cross section of the CP 24 shown in FIG. 2A taken along the line labeled 2D. The CP 24 includes a support structure 26 that defines a plurality of trial zones 27 arranged in 8 rows and 12 columns. Although the CP 24 is illustrated with 96 trial zones 27, different numbers and arrangement of trial zones 27 are suitable.

Each trial zone 27 includes a well region 28 associated with a sample region 30. The sample region 30 can include a recess where the sample can be positioned. The support structure preferably has a geometry which allows CPs 24 to be stacked on top of one another without one CP 24 interfering with the contents in the trial zones 27 of an adjacently stacked CP 24.

The CP 24 can include a bar code 32 formed on the support structure. The CP 24 can also include a surface sized to receive a bar code sticker. When the CP 24 includes a surface for receiving a bar code sticker, the bar code sticker can be removable from the CP 24 so different bar codes can be fixed to a single CP 24. The bar code allows the controller to identify a particular CP 24 from among a plurality of CPs 24 or to verify that a particular CP 24 is the CP 24 desired by the controller. The bar code reader can be positioned on the functional end of the transport mechanism such that the bar code on the CP 24 can be read as the arm approaches the CP 24 or while the arm grasps the CP 24.

FIG. 2E illustrates a trial zone 27 having a crystallization trial. A sealing medium 34 is positioned over the CP 24 such that the trial zones 27 are sealed from the ambient atmosphere and from one another. Further, the sealing medium 34 over a particular trial zone 27 allows the atmosphere over the sample to contact the atmosphere over the mother liquor. An adhesive can be employed to bond the sealing medium 34 to the support structure. Suitable sealing media 34 include, but are not limited to, transparent plastics and septa.

A mother liquor 36 is positioned in the well region 28 of the trial zone 27 and a sample 38 is formed in the sample region 30 of the trial zone 27. As is evident in FIG. 2E, the sample 38 can be a sitting drop. Although the sample is illustrated as a drop, the sample have other forms. For instance, the sample can be a layer of material coated onto a surface.

In some instances, the sample 38 is formed from a solution that includes the molecule to be crystallized, the mother liquor and optionally one or more additive solutions. The sample 38 and mother liquor 36 each include a precipitating agent. The mother liquor 36 includes a higher concentration of the precipitating agent than the sample. Over time, the solution in the sample 38 equilibrates with the mother liquor 36 by vapor diffusing from the sample 38 into the mother liquor 36. As a result, the concentration of the precipitating agent and the molecule in the sample increases over time. The increased concentration causes the molecule to precipitate. Suitable volumes for the well regions include, but are not limited to, volumes less than 1000 μL, less than 500 μL, less than less than 400 μL or less than less than 300 μL.

A variety of CPs other than the CP illustrated in FIG. 2A through FIG. 2E can be employed. For instance, the sample region can be centrally positioned in the well region. Further, the sample region and the well region can be isolated from one another on the CP. The CP can include a cover that isolates different trial zones but allows the sample region and the well region of the same trial zone to contact the same atmosphere.

Suitable CPs can also include trial zones suitable for use with hanging drop trials. In a hanging drop trial, the sample is generally positioned on a well cover. The well cover is positioned over a well region such that the hanging drop is suspended over a mother liquor in the well region. Accordingly, the well cover serves as the sample region and the well serves as the well region. A suitable CP for use with hanging drop trials includes a support structure that defines a plurality of well regions and one or more well covers that are each configured to cover one or more of the well regions. Additional CPs suitable for use with the crystallization system include, but are not limited to, the CPs disclosed in U.S. Pat. No. 6,296,673, filed on Jun. 18, 1999, entitled "Method and Apparatus for Performing Array Microcrystallizations" and incorporated herein in its entirety.

FIG. 2F is top view of a screen storage plate (SSP) 40 that is suitable for use with the system. FIG. 2G is a side view of the SSP 40 shown in FIG. 2F taken looking in the direction of the arrow labeled 2G. FIG. 2H is a cross section of the SSP 40 shown in FIG. 2F taken along the line labeled 2H. The SSP 40 includes a support structure 42 that defines a plurality of SSP wells 44 arranged in 8 rows and 12 columns. Although the SSP 40 is illustrated with 96 SSP wells 44, different numbers and arrangements of SSP wells 44 are possible. An example of a suitable SSP 40 includes, but is not limited to, a deep well plate.

During the use of an SSP 40, different SSP wells 44 contain different screen solutions. Each of these screen solutions is transferred from an SSP well 44 to a trial zone. The number of the SSP wells 44 on an SSP 40 can be the same as the number of trial zones on the CPs. As a result, when each SSP well 44 contains a screen solution, the screen solution in each SSP well 44 can be transferred into a trial zone on the same CP. Further, the arrangement of the SSP wells 44 on the SSP 40 can be about the same as the arrangement of the trial zones on the CP. This arrangement can simplify the process of transferring screen solutions from the SSP wells 44 into the trial zones.

A suitable volume for the SSP wells 44 includes, but is not limited to, volumes greater than 0.5 mL, greater than 1 mL, greater than 2 mL and/or less than 20 mL, less than 5 mL or less than 3 mL. The depth of the SSP wells 44 can be greater than the depth of the well regions in a CP. The increased depth allows the SSP wells 44 to have a larger volume than the well regions on a CP while the SSP wells 44 and well regions have about the same arrangement on each of the plate. The increased depth of the SSP wells 44 may require the SSP 40 to be thicker than the CPs.

The portion of the SSP 40 that is handled by the transport mechanism can have the same geometry as the portion of the CP that is handled by the transport mechanism. In these instances, the transport mechanism can transport both SSPs 40 and CPs. As an example, the width of a CP is labeled W in FIG. 2B and the width of an SSP 40 is labeled W in FIG. 2G. When the transport mechanism is a robotic arm, the robotic arm can include a functional end that grasps the SSPs 40 and the CPs across the width of the SSPs 40 and the CPs as illustrated below with respect to FIG. 3X. When the width of the CP has the same width as the SSP 40, the functional end of a robotic arm is able to grasp either a CP or an SSP 40.

As illustrated in FIG. 2G, the SSP 40 can include a bar code 46 formed on the support structure 42. The SSP 40 can also include a surface sized to receive a bar code sticker. When the SSP 40 includes a surface for receiving a bar code sticker, the bar code sticker is preferably removable from the SSP 40 so that different bar codes can be fixed to a single SSP 40. The bar code allows the controller to identify a particular SSP 40 from among a plurality of SSPs 40 or to verify that a particular SSP 40 is the SSP 40 desired by the controller. As noted above, the bar code reader can be positioned on the functional end of the transport mechanism such that the bar code on the SSP 40 can be read as the arm approaches the SSP 40 or while the arm grasps the SSP 40.

Figure 2K:
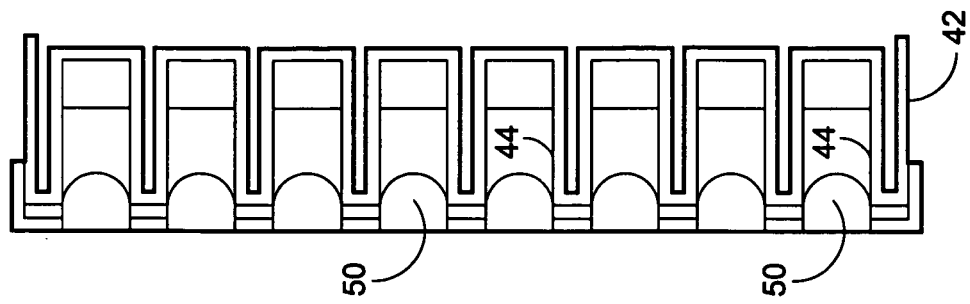
FIG. 2I through FIG. 2K illustrate a cover configured to be used with the SSP of FIG. 2F through FIG. 2H. The cover includes a plurality of plugs. The plugs are positioned such that each of the plugs seals an SSP well when the cover is positioned on the SSP.
Figure 2J:
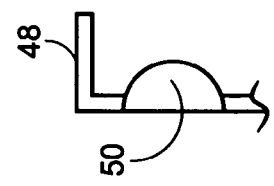
Figure 2I:
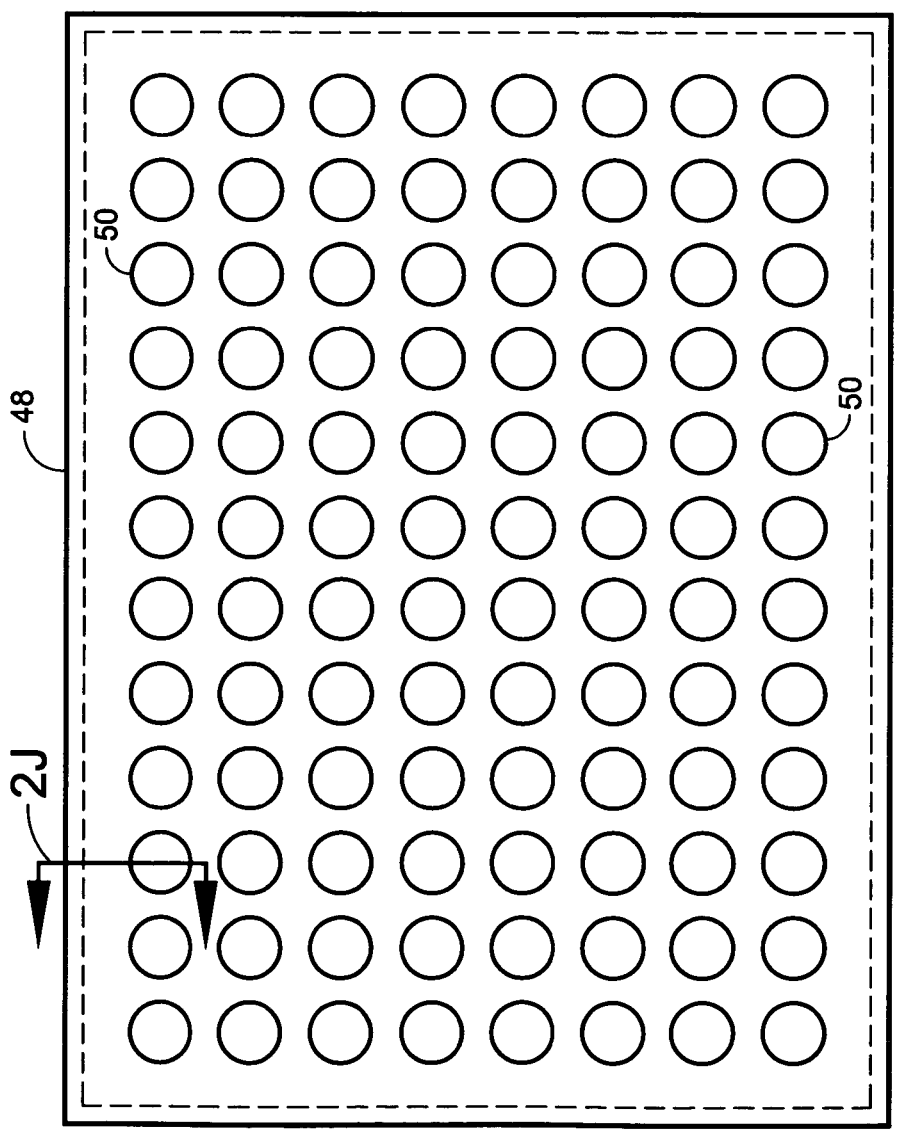

FIG. 2I is a bottom view of a cover 48 configured to be used with the SSP 40 of FIG. 2F through FIG. 2H. FIG. 2J is a cross section of the cover 48 shown in FIG. 2I taken along the line labeled 2J. The cover 48 includes a plurality of plugs 50. The plugs 50 are positioned such that when the cover 48 is positioned on the SSP 40, each of the plugs 50 seals an SSP well 44 as illustrated in FIG. 2K.

Figure 2L:
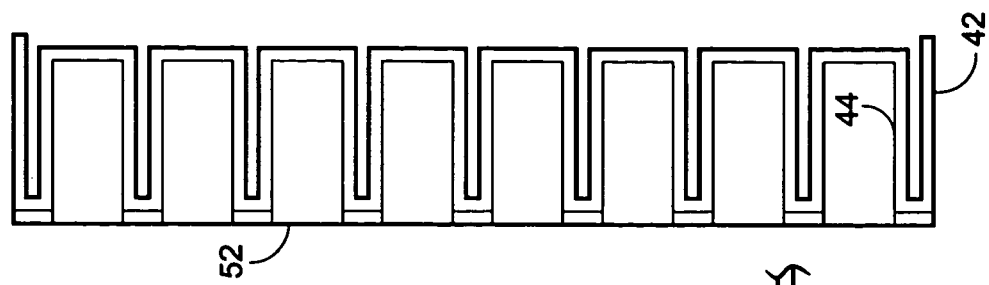
FIG. 2L illustrates a cross section of the SSP 40 having a sealing medium serving as the cover.

A sealing medium 52 can also serve as a cover. FIG. 2L is a cross section of an SSP 40 having a sealing medium 52 serving as the cover. The sealing medium 52 can be constructed of one or more layers of material. In some instances, the sealing medium 52 is a septum. Although the sealing medium 52 is shown as being positioned over each of the SSP wells 44, a sealing medium 52 can be applied to a portion of the SSP wells 44 or can be independently applied to one or more of the SSP wells 44.

Figure 2N:
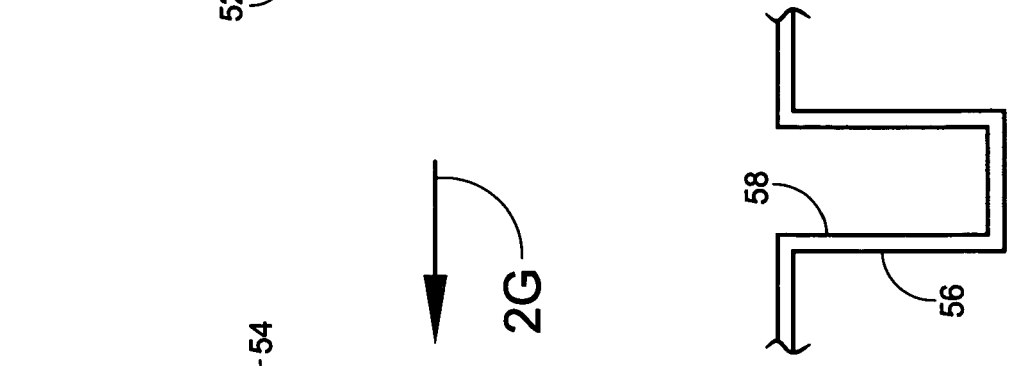
Figure 2M:
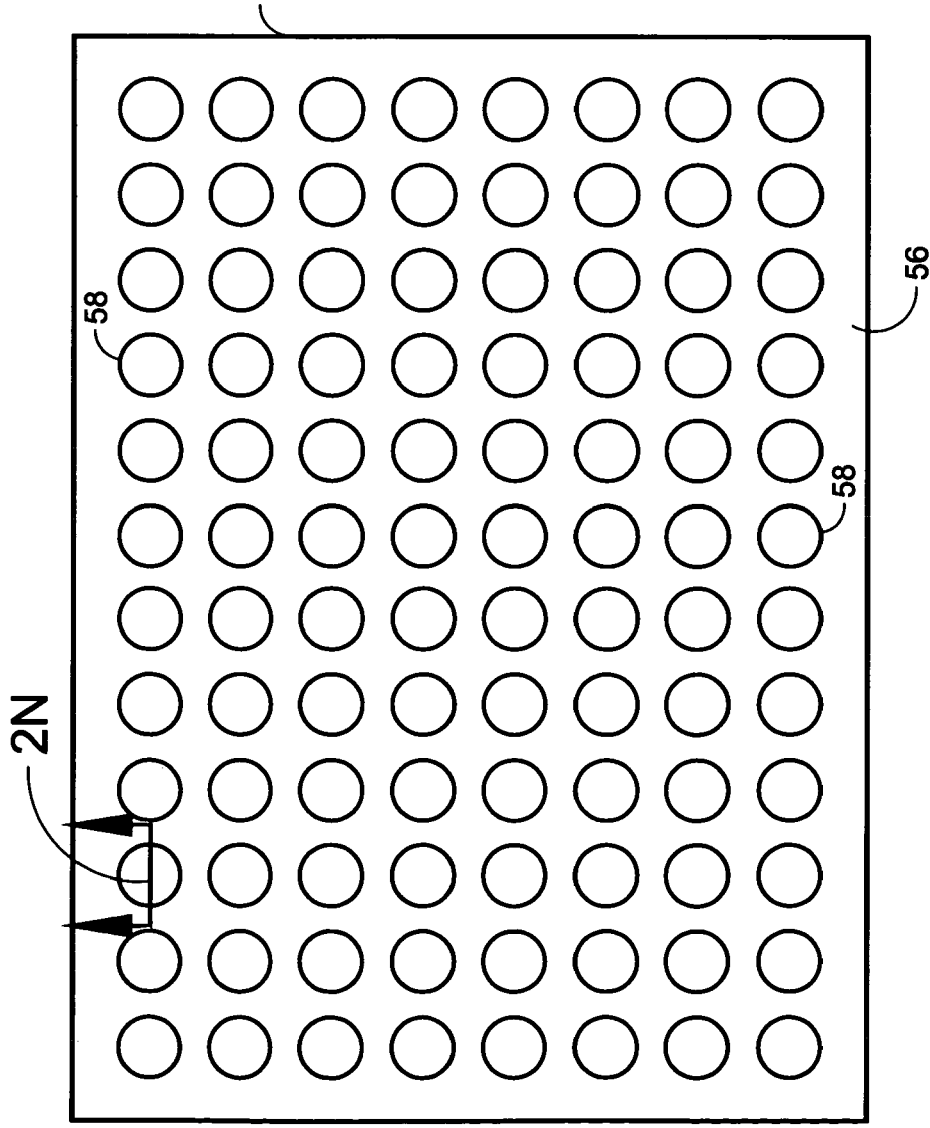

FIG. 2M is a top view of a plate 54 that is suitable for use as a molecule plate or as an additive plate. FIG. 2N is a cross section of the plate 54 shown in FIG. 2M taken along the line labeled 2N. The plate 54 includes a support structure 56 that defines a plurality of wells 58 arranged in 8 rows and 12 columns. Although the plate 54 is illustrated with 96 wells 58, different numbers and arrangements of wells 58 are possible.

During use of the plate 54 as a molecule plate, one or more of the wells 58 can contain different molecule solutions or each well 58 can contain the same molecule solution. The molecule solutions are transferred from the wells of the plate into the sample regions of a CP. The molecule solution from one well 58 can be transferred into one sample region, a plurality of sample regions or each of the sample regions. Alternately, the molecule solution from different wells 58 can each be transferred into a sample region. In some instances, the molecule solutions from different wells are each transferred into a different sample region.

During the use of the plate 54 as an additive plate, one or more of the wells 58 can contain different additive solutions or each well 58 can contain the same additive solution. The additive solutions are transferred from the wells of the plate into the well regions of a CP. The additive solution from one well 58 can be transferred into one well region, a plurality of well regions or each of each region on a CP. Alternately, the additive solution from different wells 58 can each be transferred into a single well region. In some instances, the additive solutions from different wells 58 are each transferred into a different well region on the CP.

Figure 3D:
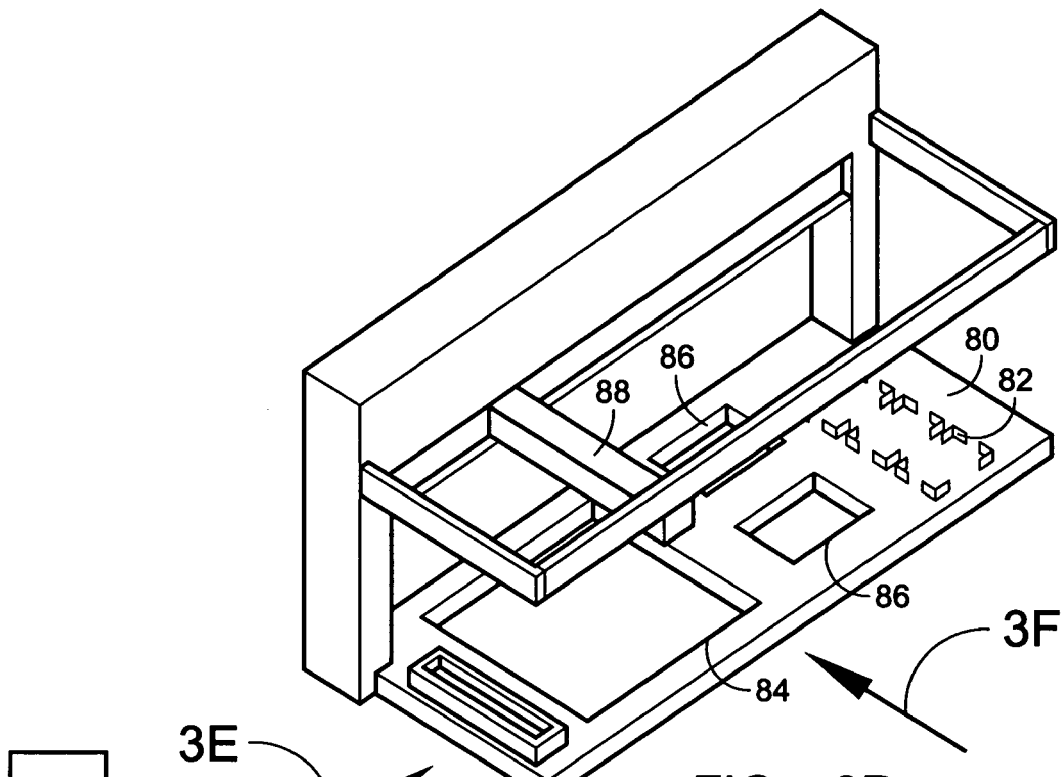
FIG. 3D through FIG. 3F illustrate a screen generation station that is suitable for use with the crystallization system.
Figure 3E:
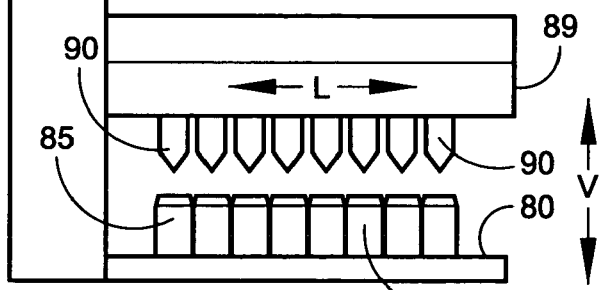
Figure 3F:
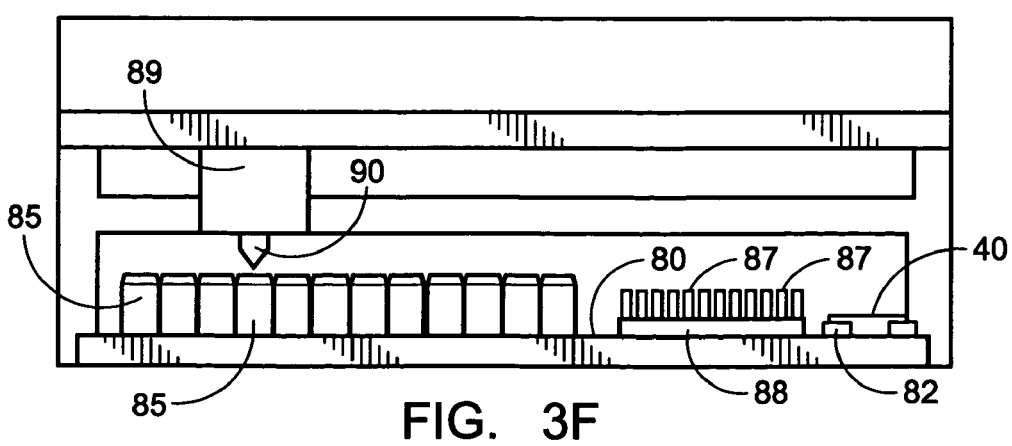
Figure 3N:
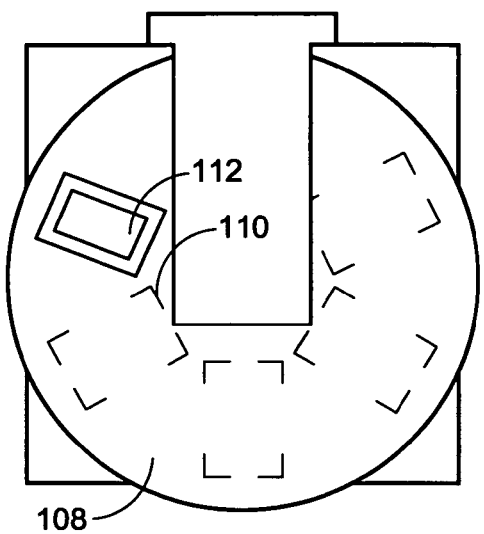
Figure 3M:
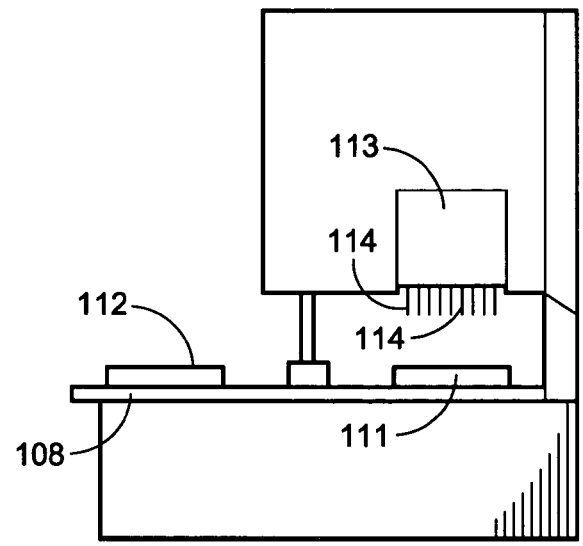
Figure 3O:
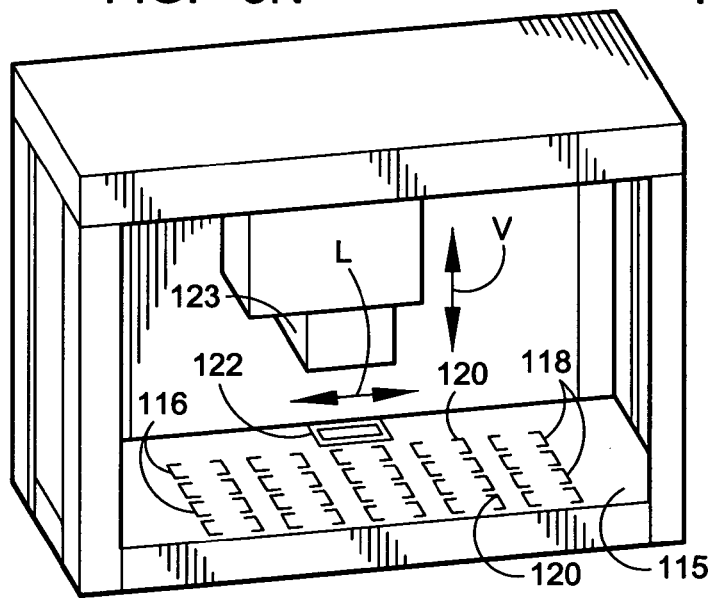
FIG. 3O through FIG. 3S illustrate a trial generation station suitable for use with the crystallization system.
Figure 3P:
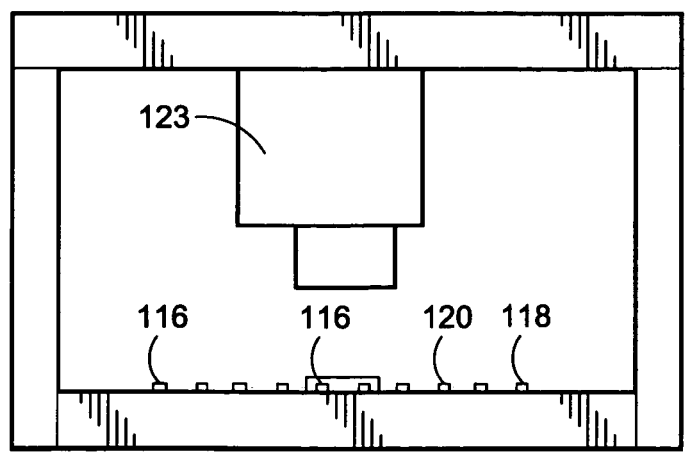
Figure 3Q:
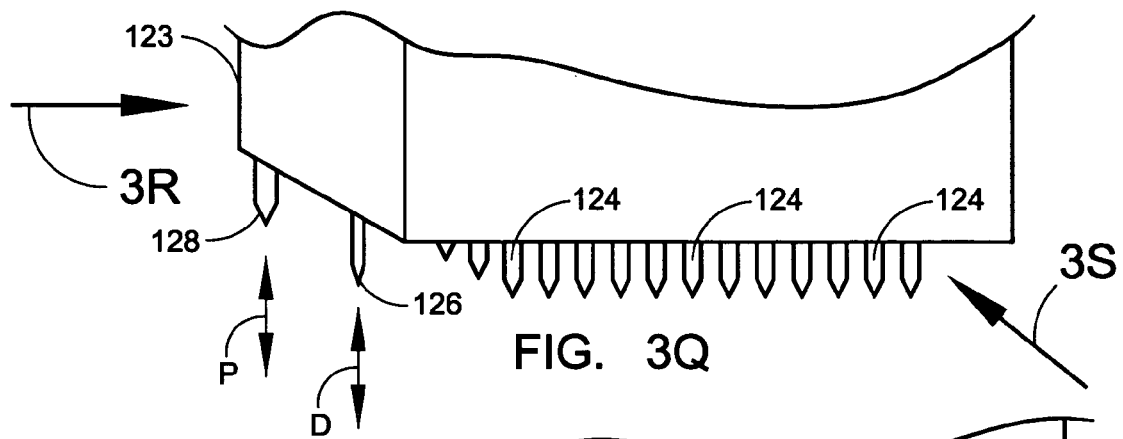
Figure 3R:
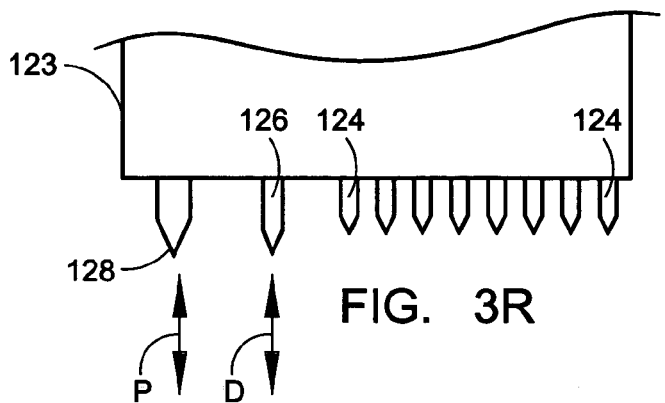
Figure 3S:
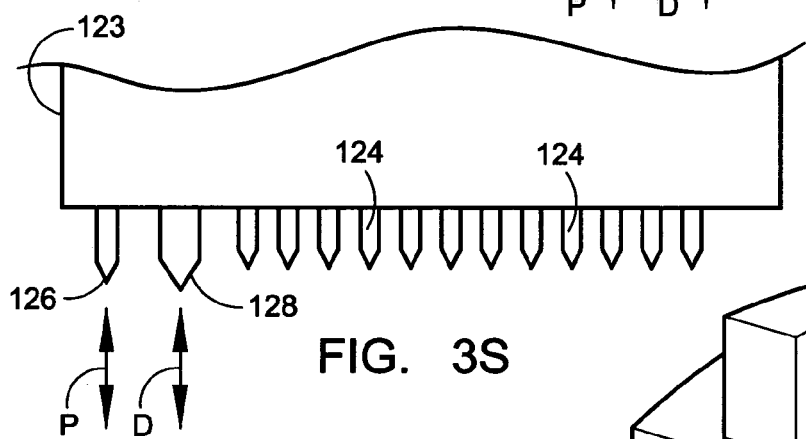
Figure 3T:
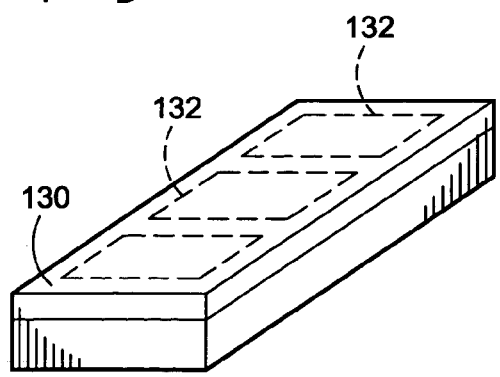
FIG. 3T is a perspective view of a mixing station that is suitable for use with the system.
Figure 3U:
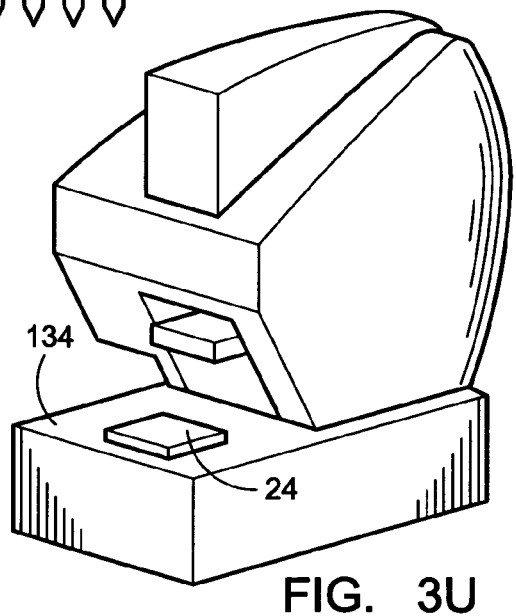
FIG. 3U is a perspective view of a sealing station configured to seal crystallization trials on a crystallization plate from the atmosphere.
Figure 3V:
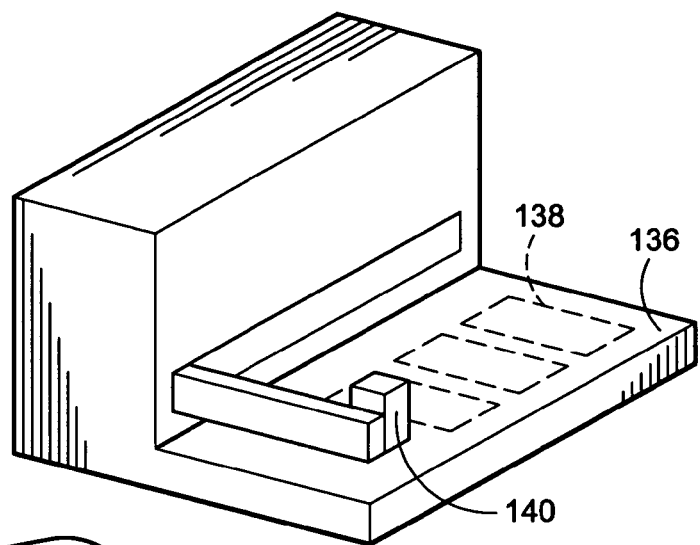
FIG. 3V is a perspective view of an imaging station configured to generate images of crystallization trials formed in the trial zones of a CP.
Figure 3W:
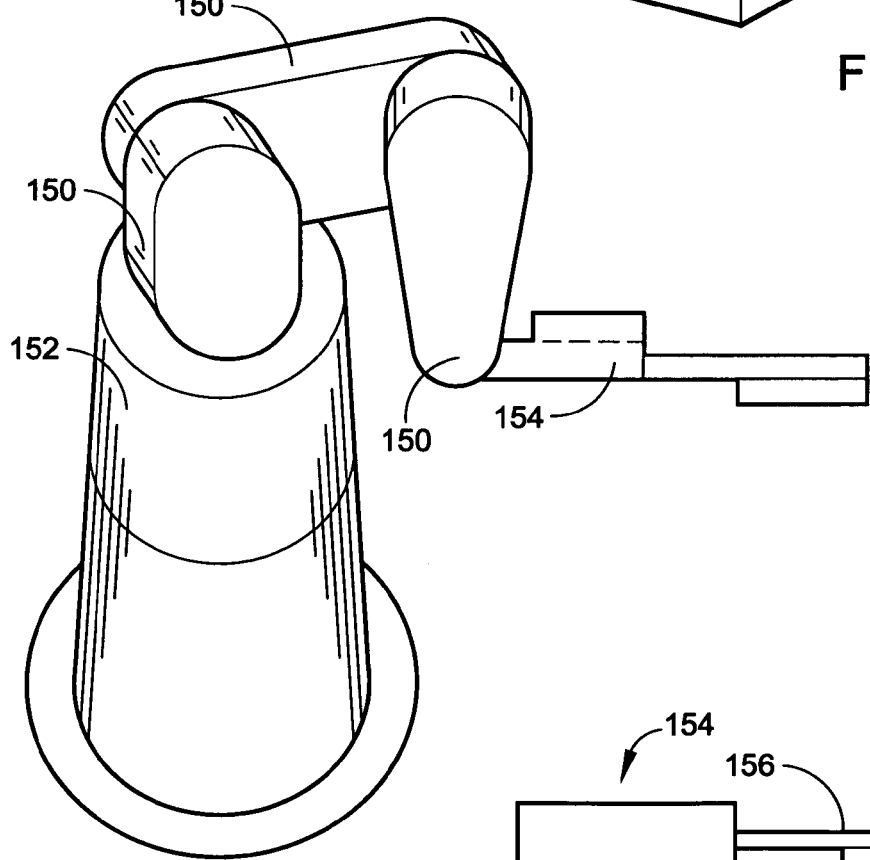
FIG. 3W and FIG. 3X illustrate a robotic arm suitable for transporting SSPs and/or CPs from one of the stations to another of the stations.
Figure 3X:
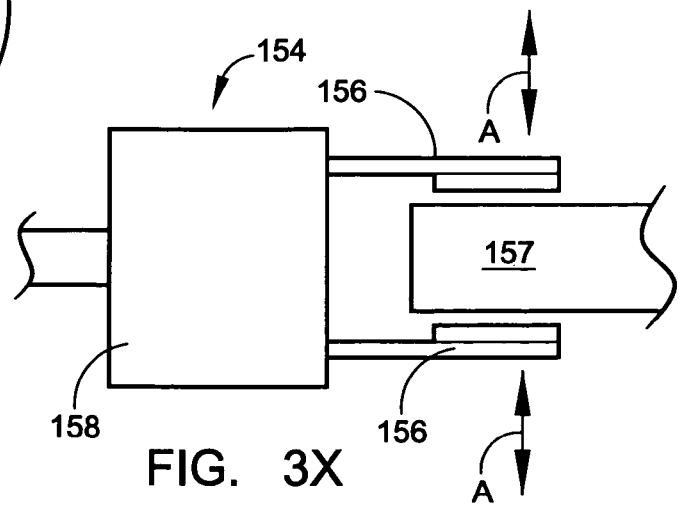
Figure 3Y:
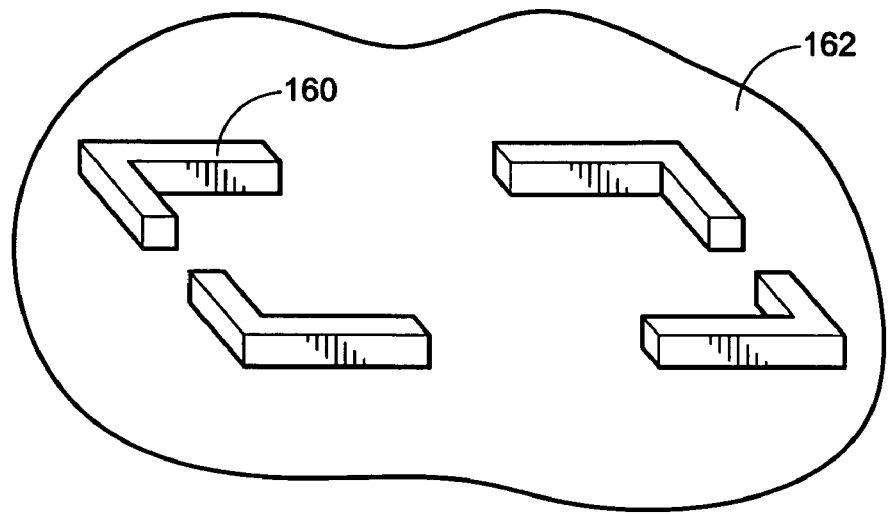
Figure 3Z:
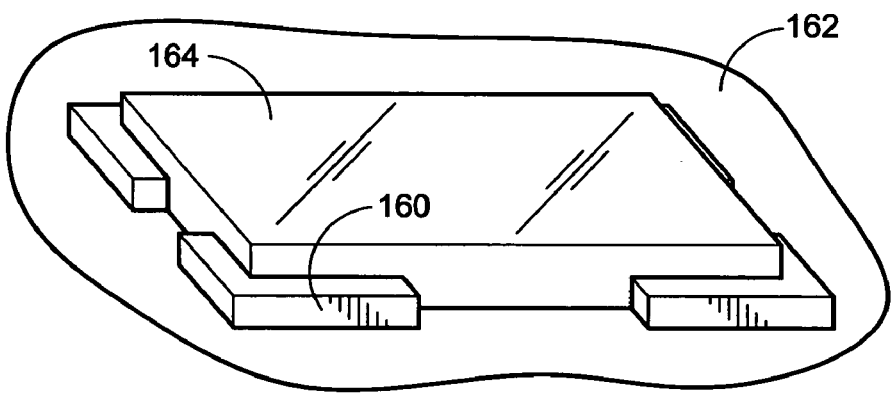
FIG. 3Z is also a perspective view of a placeholder.
Figure 3A:
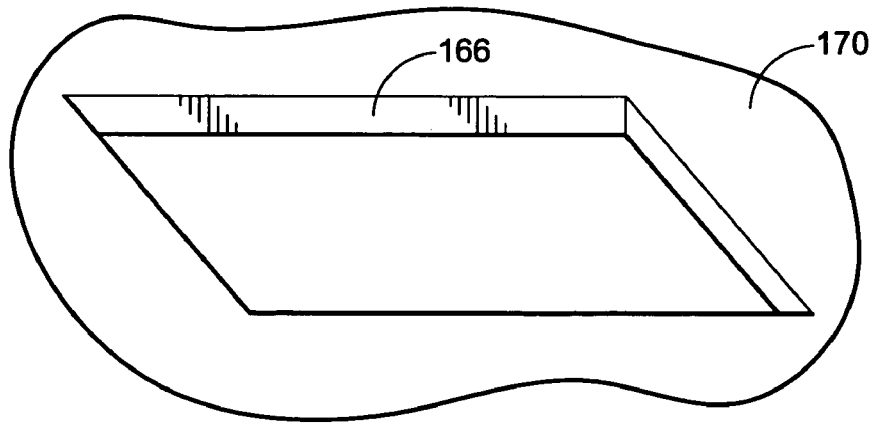
FIG. 3A through FIG. 3AA illustrate suitable constructions for a selection of stations employed by the system.

FIG. 3A is a perspective view of one embodiment of a crystallization system. A controller (not illustrated) controls a transport mechanism 14 configured to access a plurality of stations. The crystallization system includes a plurality of CP storage stations 60, a screen generation station 61, a screen storage station 62, a screen replicator 63 and a trial generation station 64. Additionally, the crystallization station includes a sealing station 65, a mixing station 66 and an imaging station 67.

FIG. 3B through FIG. 3AA illustrate each of the stations shown in FIG. 3A. FIG. 3B and FIG. 3C illustrate a storage structure that is suitable for use as a primary CP storage station and/or as a secondary CP storage station. FIG. 3B is a side view of the storage structure. FIG. 3C is a side view of the storage structure shown in FIG. 3B taken looking in the direction of the arrow labeled 3C. The storage structure includes a tower 68 having one or more chutes 70 that are each sized to receive a stack of plates arranged one on top of another. The tower 68 is positioned on a base 72. The storage structure also includes a platform 74 positioned under the tower 68. The platform 74 includes one or more CP placeholders 76 where a CP 24 can be positioned.

The storage structure also includes a mechanism (not shown) for moving the platform 74 relative to the base 72 as illustrated by the arrow labeled A. The clearance between the tower 68 and the track is enough to allow a CP 24 positioned on the platform 74 to be moved from under the tower 68.

The storage structure also includes plate-loading mechanics (not shown) which can be engaged to raise a CP 24 from the platform 74 and add it to the bottom of the stack and/or to lower a CP at the bottom of the stack onto the platform 74. When the plate loading mechanics are operated so as to lower a CP onto the platform 74, gravity moves a new CP into position at the bottom of the stack.

In some instances, a storage structure is operated so as to lower a CP from the chute 70 onto the platform 74. During operation of the storage structure, the platform 74 is moved such that the placeholder 76 is positioned under a chute 70.

The plate loading mechanics are operated so as to lower a CP from the chute 70 onto the placeholder 76. The platform 74 is moved such that the CP is moved from under the tower 68 where it can be accessed by the transport mechanism. The transport mechanism can then grasp the CP and remove it from the platform 74.

A storage structure can be operated so as to raise a CP from the platform 74 into the chute 70. For instance, the platform 74 can be moved such that the transport mechanism can access the placeholder 76. The transport mechanism can position a CP on the placeholder 76. The platform 74 can be moved such that the CP is positioned under a chute 70. The plate loading mechanics are operated so as to raise the CP from the platform 74 into the chute 70. As a result, a plurality of CPs can be stored in the storage structure after the CP has been processed by the system. For instance, the system can form crystallization trials in the CP and then store the CP in the storage structure.

In some instances, the tower 68 is configured to be detachable from the base 72. The CPs present in the tower 68 before the tower 68 is detached can remain intact in the tower 68. As a result, the system can store a collection of CPs that have crystallization trials in one of the storage structures. An operator can remove the collection from the system by removing the tower 68 from the storage structure. Additionally, an operator can provide a collection of CPs to the system by placing the collection of CPs in a tower 68 and then placing the tower 68 on the base 72 of a storage structure.

One or more of the storage structures can be located in a chamber. For instance, the CP storage structure labeled A in FIG. 3A is located in a chamber 78. The chamber 78 can include an opening with a cover such as a door (not shown). The cover can open to allow one or more CPs to pass through the opening. After one or more CPs pass through the opening, the cover can be closed so as to increase the degree of isolation of the atmosphere in the chamber 78 from the atmosphere outside of the chamber 78. The atmosphere in the chamber 78 can be controlled. For instance, the chamber 78 can be refrigerated and/or heated so as to control the temperature of the CPs stored in the storage structure. As a result, when CPs with crystallization trials are stored in a chamber 78, the crystallization trials can be stored under controlled conditions. An example of a CP storage station suitable for use with the system is a CCS Packard PlateStak instrument made by CCS Packard, Inc. located in Torrance, Calif.

FIG. 3D through FIG. 3F illustrate a screen generation station that is suitable for use with the crystallization system. FIG. 3D is a perspective view of the screen generation station. FIG. 3E is a side view of the screen generation station shown in FIG. 3D taken looking in the direction of the arrow labeled 3E and FIG. 3F is a side view of the screen generation station shown in FIG. 3D taken looking in the direction of the arrow labeled 3F. The illustrated screen generation station is configured to generate screen solutions and to position the samples in an SSP. Further, the illustrated screen generation station generates the screen solutions in the SSP.

The screen generation station includes a deck 80 with one or more SSP placeholders 82 where the transport mechanism can place an SSP and/or from which the transport mechanism can remove an SSP. The deck 80 of the screen generation station also includes bottle placeholders 84 for bottles 85 of stock solutions. Suitable bottle placeholders 84 constrain movement of the bottles 85 on the deck 80. Example bottle placeholders 84 include ridges extending from the deck 80 and/or recesses in the deck 80. The stock solutions can serve as the component solutions used in generating the screen solutions. Suitable bottles 85 include, but are not limited to 500 mL bottles with a 2" diameter. In some instances, the number of bottle placeholders 84 is equal to the number of SSP wells in an SSP. For instance, the SSPs can have 96 SSP wells and the screen generation station can have 96 bottle placeholders 84.

The deck 80 of the screen generation station also includes receptacle placeholders 86 for one or more sets of receptacles 87. Suitable receptacle placeholders 86 can constrain movement of the receptacles 87 on the deck 80. Example receptacle placeholders 86 include ridges extending from the deck 80 and/or recesses in the deck 80. Suitable receptacles 87 include, but are not limited to, test tubes. As will become evident below, the receptacles 87 can hold component solutions that are randomly accessed for the generation of screen solutions. As a result, the number of receptacles 87 that can be held by the screen generation station can be a matter of choice with respect to the number of component solutions that are needed for efficient operation of the system. A set of receptacles 87 can be positioned in a structure 88 that is removable from the screen generation station. For instance, the receptacles 87 can be positioned in a rack such as a 15 mL falcon tube rack. A receptacle placeholder 86 can be configured to receive a rack on the screen generation station. As a result, the component solutions in the receptacles 87 can be concurrently changed or refreshed by replacing the rack.

The screen generation station also includes a transfer mechanism configured to transfer the component solutions from the bottles 85 and/or receptacles 87 to an SSP. For instance, the screen generation station includes a head 89 configured to move in a horizontal plane. The head 89 includes a plurality of fluid dispensers 90. Each fluid dispenser 90 is in communication with conduits pumps and/or valves that allow the fluid dispenser 90 to extract a component solution from a bottle 85 or a receptacle 87 and to dispense the component solution into an SSP well. Suitable fluid dispensers 90 include, but are not limited to, dispensers 90 with a capacity of at least 10 µL and a CV of about 5% wherein CV is the coefficient of variance for the dispenser. CV is calculated as CV %=standard deviation of the volumes dispensed× 100/mean volume dispensed at 10 µL.

In some instances, the number of fluid dispensers 90 on the head 89 is equal to the number of rows of SSP wells on the SSP and/or to the number of columns of SSP wells on the SSP. As a result, each dispenser 90 can be associated with a row of SSP wells on the SSP in that the dispenser 90 dispenses component solutions into the SSP wells of the associated row. Alternately, each dispenser 90 can be associated with a column of SSP wells on the SSP in that the dispenser 90 dispenses component solution into the SSP wells of the associated column. The illustrated head 89 has 8 dispensers 90 which is equal to the number of rows of SSP wells in the SSP of FIG. 2F.

The dispensers 90 can be moved relative to one another. For instance, each of the dispensers 90 can be moved vertically as illustrated by the arrow labeled A in FIG. 3E. Additionally, the dispensers 90 can be moved laterally relative to one another as shown by the arrow labeled L in FIG. 3E. As a result, the dispensers 90 can be moved further apart from one another or can be moved together. In some instances, the dispensers 90 can be moved such that the displacement between any one of the dispensers 90 and the adjacent dispenser 90(*s*) is greater than the displacement between any other pair of dispensers 90. The combined movement of the head 89 and the dispensers 90 allows any single dispenser 90 to access the component solution in any one of the receptacles 87 while the other dispensers 90 are positioned outside of the other receptacles 87. In some instances, the combined movement of the head 89 and the dispensers 90 allows any single dispenser 90 to access the component solution in any one of the bottles 85 while the remaining dispensers 90 are outside of the other bottles 85.

The screen generation station also includes a wash station. A suitable wash station includes a vessel through which a wash fluid can be circulated. In some instance, the wash station includes one or more vacuum ports. The dispensers 90 can be positioned over or in the vacuum ports. A vacuum can then be pulled so as to remove any liquid remaining on the tips of the dispensers 90 before the dispensers 90 are used again.

During operation of the screen generation station, a transport mechanism transports an empty SSP to an SSP placeholder 82 on the deck 80. The transport mechanism can leave the SSP on the deck 80 while it performs other functions or can remain grasping the SSP during the generation of the screen.

In some instances, a screen is generated in the SSP by transferring the component solution in each of the bottles 85 into a different SSP well on the SSP. For instance, the head 89 can be moved such that the dispensers 90 are each positioned above a column of bottles 85 that has not previously been accessed during the generation of the screen. The dispensers 90 are lowered into the component solution in the column of bottles 85 and the desired amount of the component solution is extracted. The dispensers 90 are raised out of the bottles 85. The head 89 and dispensers 90 are moved such that each dispenser 90 is positioned over an SSP well in a column of the SSP. The dispensers 90 are lowered into their respective SSP wells and the component solutions are dispensed into the SSP wells. The head 89 and dispensers 90 are moved to the wash station and the dispensers 90 washed. The washing can be performed by repeatedly extracting and dispensing a wash solution from a vessel in the wash station. When one or more vacuum ports are available, the dispensers 90 are moved into position over the one or more vacuum ports and a vacuum is applied to remove any liquid remaining on the tips of the dispensers 90. The above steps can be repeated until each column of SSP wells on the SSP plate contains a screen solution. Once each of the columns has been selected, the transport mechanism can remove the SSP from the deck 80. When a screen is generated as described above, the component solutions in the bottles 85 can be selected such that the resulting screen is a coarse screen. As a result, the above method can efficiently generate coarse screens.

In some instances, a screen is generated by combining component solutions from different receptacles and/or different bottles 85 in one or more SSP wells. For the purposes of the following discussion, each dispenser 90 is associated with a row of SSP wells in that each dispenser 90 dispenses component solution into the SSP wells of the associated row. As a result, the dispensers 90 can concurrently fill the SSP wells in a column of the SSP wells.

The controller accesses a screen generation database (discussed below) to determine the recipe for preparing the screen solution in each of the SSP wells. The controller selects an SSP well in a column of the SSP and accesses a screen generation database to identify the component solutions that are to be transferred into the selected SSP well. When all of the required component solutions have been dispensed into the selected SSP well, the controller selects another SSP well in the selected column. When the database shows that all of the required component solutions have not been transferred into the selected SSP well, the controller identifies a component solution that has not been dispensed into the selected SSP well and identifies the quantity of the component solution that needs to be dispensed into the selected SSP well. The controller then identifies the bottle 85 or receptacle that contains the selected component solution. The controller causes the head 89 and dispensers 90 to be moved such that the dispenser 90 associated with the row that includes the selected SSP well is located over the identified receptacle or bottle 85. The selected dispenser 90 is lowered into the component solution within the selected receptacle or bottle 85 and the desired amount of the component solution is extracted. The selected dispenser 90 is then raised out of the receptacle or the bottle 85. This process is repeated until each SSP well in the selected column of SSP wells is selected. After each SSP well in the selected column of SSP wells has been selected, the head 89 and dispensers 90 are moved such that each dispenser 90 is positioned over an SSP well in the associated row and in the selected column. The dispensers 90 are lowered into their respective SSP wells and the component solutions are dispensed into the SSP wells. The head 89 and dispensers 90 are moved to the wash station and the dispensers 90 washed. The washing can be performed by repeatedly extracting and dispensing a wash solution from a vessel in the wash station. When one or more vacuum ports are available, the dispensers 90 are moved into position over the one or more vacuum ports and a vacuum is applied to remove any liquid remaining on the tips of the dispensers 90. The above steps can be repeated for the same column of SSP wells until each of the required component solutions have been dispensed into each of the SSP wells in the selected column. Once the required component solutions have been dispensed into each SSP well in the selected column, another column of SSP wells is selected until each of the columns has been selected. Once each of the columns has been selected, the transport mechanism can remove the SSP from the deck 80. Because the above method allows for different combinations of component solutions to be transferred into the SSP wells, the screen generation station can efficiently generate a wide range of optimization screens.

Although the above method of operating the screen generation station is described in the context of each dispenser 90 being associated with a row of SSP wells, the above method can also be employed when each dispenser 90 is associated with a column of SSP wells.

FIG. 3G through FIG. 3K illustrate a screen storage station that is suitable for storing screens and screen libraries. FIG. 3G is a perspective view of the outside of the screen storage station. The screen storage station includes a container 92 with a service opening 94 through which SSPs can be passed. The screen storage station also includes a holder 94 for holding an SSP. The holder 94 is configured such that the transport mechanism can remove an SSP from the holder 94 or position an SSP in the holder 94. Additionally, the holder 94 is configured such that the lift described below can be positioned between the holder 94 and an SSP held by the holder 94.

The screen storage station also includes an opener 96. The opener 96 includes a cover (not shown) and is configured to position the cover over the service opening 94 so as to increase the isolation of the atmosphere in the container 92 from the atmosphere outside of the container 92. The opener 96 is also configured to withdraw the cover from the service opening 94 such that an SSP can pass through the opening.

The screen storage device can also include an operator access 97 that allows an operator to access SSPs stored in the screen storage station. An example of a suitable operator access 97 is a door. The operator can use the operator access 97 to remove SSPs from the screen storage station or to add SSPs to the screen storage station. For instance, an operator can position SSPs that are generated outside the system in the screen storage station and/or to position empty SSPs in the screen storage station. Further, an operator can remove and SSP from the screen storage station, modify the removed SSP and/or the screen solutions contained in the removed SSP and return the SSP to the screen storage station.

The interior of the container 92 can be climate controlled to reduce changes in the composition of screen solutions stored in the interior of the container 92. In some instances, the screen storage station is refrigerated.

FIG. 3H is a perspective view of a housing 98 configured to house SSPs in the interior of the container 92. The housing 98 includes a plurality of supports 99 configured to support the SSPs in the housing 98. Accordingly, the supports 99 define ports 100 where the SSPs can be positioned in the housing 98.

FIG. 3I illustrates the housing 98 in conjunction with mechanics located in the container 92. The housing 98 is positioned adjacent to a plate transporter 101. The plate transporter 101 includes a carriage 102 configured to move vertically on a support 103 as illustrated by the arrow labeled A. Additionally, the carriage 102 is configured to rotate relative to the support 103 as illustrated by the arrow labeled B. The carriage 102 also includes an SSP lift 104. The lift 104 is configured to be extended and retracted relative to the carriage 102 as illustrated by the arrows labeled C. FIG. 3I illustrates the lift 104 in the retracted position. FIG. 3J illustrates the lift 104 in the extended position. An SSP can be positioned on the lift 104 as is also illustrated in FIG. 3J. The SSP remains stationary on the lift 104 as the lift 104 is extended and retracted.

The housing 98 can optionally be positioned on a deck 105. Although a single housing 98 is shown positioned on the deck 105, a plurality of housings 98 can be positioned on the deck 105. When a plurality of housings 98 are positioned on the deck 105, the deck 105 can be rotated relative to the plate transporter 101 as illustrated by the arrow labeled D. As a result, a particular housing 98 can be moved into a particular location relative to the plate transporter 101. The use of multiple housings 98 allows the capacity of the screen storage station to be expanded.

The storage station can be operated so as to move a target SSP from a particular port 100 in the container 92 onto the holder 94 outside of the container 92. When a plurality of housings 98 are positioned on a deck 105, the deck 105 is rotated such that the housing 98 having the target SSP is located at a transport position where the target SSP can be accessed by the plate transporter 101. The carriage 102 is operated with the lift 104 in the retracted position. The carriage 102 is rotated such that the operational end of the lift 104 is adjacent to the housing 98. The carriage 102 is moved vertically so as to align the carriage 102 with the target SSP. The lift 104 is extended such that the lift 104 is located under the target SSP. The carriage 102 is elevated so as to lift the target SSP from the supports 99. The lift 104 is retracted so as to withdraw the target SSP from the port 100. The carriage 102 is moved vertically so as to align the target SSP with the service opening 94. The carriage 102 is rotated such that the functional end of the carriage 102 is adjacent to the service opening 94. The cover is removed from the service opening 94. The lift 104 is extended so as to move the target SSP through the service opening 94 as illustrated in FIG. 3J. The carriage 102 is lowered such that the target SSP rests on the holder 94. The lift 104 is retracted leaving the target SSP in place on the holder 94. The cover is positioned over the service opening 94. One or more of the above actions may be optional. The above actions can be performed in an order different from the described order.

The storage station can be operated so as to move an SSP from the holder 94 into a target port 100 in the container 92. The transport mechanism can position an SSP on the holder 94. The carriage 102 is moved vertically so as to align the carriage 102 with the service opening 94. The carriage 102 is rotated such that the functional end of the carriage 102 is adjacent to the service opening 94. The cover is removed from the service opening 94. The lift 104 is extended such that the lift 104 is positioned between the SSP and the holder 94. The carriage 102 is elevated so as to lift the SSP from the holder 94. The lift 104 is retracted so as to pull the SSP into the container 92. The cover is positioned over the service opening 94. When a plurality of housings 98 are positioned on a deck 105, the deck 105 is rotated such that the housing 98 having the target port 100 is located at a transport position where the target SSP can be accessed by the plate transporter 101. The carriage 102 is rotated such that the operational end of the lift 104 is adjacent to the housing 98 in the transport position. The carriage 102 is moved vertically so as to align the carriage 102 with the target port 100. The lift 104 is extended so as to move the SSP into the target port 100. The carriage 102 is lowered such that the SSP rests on the supports in the holder 94. The lift 104 is retracted, leaving the SSP in place in the target port 100. One or more of the above actions may be optional. The above actions can be performed in an order different from the described order.

The controller includes logic for causing the above actions. For instance, the controller includes logic for causing the screen storage station to retrieve a particular SSP from within the container 92 and making that SSP accessible to the transport mechanism and/or logic for causing the screen storage station to move an SSP from the holder 94 into the interior of the container 92.

In some instances, the screen storage station includes a covering device 106 as illustrated in FIG. 3K. The covering device 106 can be configured to place a cover on an SSP being moved from a holder 94 into the screen storage station. Additionally, the covering device 106 can be configured to remove the covers being moved from the screen storage station to the holder 94. Accordingly, each SSP placed in the screen storage station can include a cover that is removed before the SSP is accessed by the transport mechanism. An example of a cover that can be employed with the covering device 106 is illustrated in FIG. 2I through FIG. 2K.

As will become evident below, an SSP can be moved from the screen storage station used and then placed back in the screen storage station. In these instances, the covering device 106 is preferably constructed such that the same cover removed from the SSP is placed back on the SSP. A suitable screen storage station for use with the covering device 106 includes, but is not limited to, a HERAEUS CYTOMAT available from Kendro Laboratory Products, Inc., Newtown, Conn.

An alternate covering device 106 can place a sealing medium on an SSP. The covering device 106 can place the sealing medium on an SSP as the SSP is being moved into the screen storage station and/or as the SSP is being taken from the screen storage station. The covering device 106 can employ a detector to detect when a cover is not on place. The covering device 106 can apply a cover when one is not detected. Alternately, the controller can include logic for causing the covering device 106 to place the cover on the SSP. As noted above, a suitable sealing medium includes, but is not limited to, a septum.

A covering device 106 can employ a different plate transporting mechanism than the screen storage station. For instance, the plate-covering device 106 can include a transporting mechanism that receives an SSP from the screen storage station and then moves the plate to the holder 94. Further, the covering device 106 can be independent from the screen storage station. For instance, the covering device 106 can be another station to and/or from which the transport mechanism transports SSPs.

Although the container of the screen storage station is illustrated as a box, different embodiments of the container are envisioned. For instance, it may be desirable for the container to be a room where SSPs are stored.

FIG. 3L through FIG. 3N illustrate an embodiment of a screen replicator suitable for use with the crystallization system. FIG. 3L is a perspective view of the screen replicator. FIG. 3M is a side view of the screen replicator shown in FIG. 3L taken looking in the direction of the arrow labeled 3M and FIG. 3N is a top view of the screen replicator shown in FIG. 3L. The screen replicator includes a deck 108 with a plurality of placeholders 110 that are each configured to hold a plate 111 such as SSP and/or a CP. The transport mechanism can position a plate on one or more of the placeholders 110 and/or remove a plate from one or more of the placeholders 110.

A wash station 112 can also be positioned on the deck 108. A suitable wash station 112 includes a vessel through which a wash fluid can be circulated. In some instance, the wash station 112 includes one or more vacuum ports.

The screen replicator also includes a transfer mechanism configured to transfer portions of different screen solutions from a screen storage plate to a crystallization plate. For instance, the illustrated screen replicator includes a head 113 that serves as the transfer mechanism. The deck 108 can be rotated such that a plate on the deck 108 or the wash station 112 is positioned under the head 113.

The head 113 can be configured to move vertically relative to the plates. Additionally, the head 113 includes a plurality of fluid dispensers 114. In some instances, the number of fluid dispensers 114 on the head 113 is equal to the number of SSP wells in an SSP or the number of trial zones in a CP. Further, the fluid dispensers 114 can be positioned on the head 113 in the same arrangement as the SSP wells are positioned on the SSP or as the trial zones are positioned on the CP. As a result, when a plate is positioned under the head 113, the head 113 can be lowered such that each fluid dispenser 114 is positioned to dispense fluid into each of the wells on the SSP and/or into each of the well regions on a CP. Suitable dispensers 114 for use with the screen replicator include, but are not limited to, dispensers 114 with a range of 50 µL to 100 µL and a CV below 10%.

During operation of the screen replicator, the transport mechanism positions one or more full SSPs in a placeholders 110 and one or more empty CPs in a placeholder 110. The deck 108 is rotated such that the SSP containing the desired screen is positioned under the head 113. The head 113 is lowered such that each fluid dispenser 114 is positioned in an SSP well. The fluid dispensers 114 extract the screen solutions from the SSP wells and the head 113 is raised. The deck 108 is rotated so the desired empty CP is positioned under the head 113 and the head 113 is lowered such that each fluid dispenser 114 is positioned over the well region of a trial zone. The screen solutions are then dispensed from each fluid dispenser 114 into the well regions of the trial zones. The head 113 is raised and the deck 108 rotated to allow the screen replicator to perform additional operations. For instance, the deck 108 can be rotated so as to extract additional screen solution from the SSP for dispensing into another empty CP. Alternately, the deck 108 can be rotated such that the wash station 112 is positioned under the head 113. Washing the dispensers 114 can include employing the dispensers 114 to extract the wash solution form the vessel and dispense the wash solution back into the vessel. This can be repeated until the desired level of washing is achieved. In some instance, the wash station 112 includes one or more vacuum ports. The deck 108 can be rotated and/or the head 113 moved such that the dispensers 114 are positioned over or in the vacuum ports. A vacuum can be pulled so as to remove any liquid remaining on the tips of the dispensers 114. At some time the deck 108 is rotated to a position that allows the transport mechanism to grasp one or more filled CPs and remove them from the screen replicator.

In some instances, the SSP will include a sealing medium positioned over one or more SSP as noted with respect to FIG. 2L. In these instances, the dispensers 114 pierce the sealing medium to access the screen solutions covered by the sealing medium. As noted above, the sealing medium can be a septum. As a result, the sealing medium reseals after the screen solutions are accessed.

In some instances, a plurality of CPs are filled from a single SSP. The CPs can be filled serially. For instance, each of the CPs can be transported to the screen replicator, filled and removed one after another. Alternately, a plurality of empty CPs can be transported to different placeholders 110 on the CP. The empty CPs can be filled one after another and then removed. Alternately, a combination of these filling techniques can be employed.

In some instances, a plurality of SSPs are positioned on the deck 108 of the screen replicator. The use of multiple SSPs can reduce the handling of an SSP. For instance, an SSP can be used and left in place on the screen replicator until a later time when the SSP is required again.

It may be desirable to wash the fluid dispensers 114 after filling a CP or after performing other operations. The washing can be performed by repeatedly extracting and dispensing a wash solution from a vessel in the wash station 112. When one or more vacuum ports are available, the dispensers 114 are moved into position over the one or more vacuum ports and a vacuum is applied to remove any liquid remaining on the tips of the dispensers 114.

The screen replicator illustrated above moves the plates relative to the head 113. An example of a suitable screen replicator that moves the plates relative to a head 113 includes, but is not limited to, a Tecan TeMo manufactured by Tecan, Inc. located in Maennedorf, Switzerland. Other types of screen replicators can be employed. For instance, an example of a screen replicator that moves the head 113 relative to plates and can be employed with the system includes, but is not limited to, a Zymark Rapid Plate made by Zymark, Inc. located in Hopkinton, Mass.

FIG. 3O through FIG. 3S illustrate a trial generation station suitable for use with the crystallization system. FIG. 3O is a perspective view of the trial generation station. FIG. 3P is a side view of the trial generation station shown in FIG. 3O taken looking in the direction of the arrow labeled 3P. The illustrated trial generation station is configured to generate crystallization samples and position the samples in a crystallization plate. Further, the illustrated trial generation station generates the crystallization samples in the crystallization plates.

The trial generation station includes a deck 115 with a plurality of CP placeholders 116 that are each configured to hold a CP. The transport mechanism can position a CP on one or more of the CP placeholders 116 and/or remove a CP from one or more of the CP placeholders 116. The deck 115 also includes one or more molecule placeholders 118 that are each configured to hold a molecule plate (not shown). The molecule plate can have one or more wells for holding a molecule solution that includes the molecule to be crystallized by the system. In some instances, the number of wells in a molecule plate is equal to the number trial zones on a CP. Further, the wells on the molecule plate can be positioned in the same arrangement as the well regions on the CP. In some instances, one or more of the molecule placeholders 118 is refrigerated to preserve the integrity of the molecule solution and/or to maintain the molecule solution at a temperature suitable for a crystallization trial. The molecule solution may be manually prepared and may be manually placed in the placeholder. Alternately, the preparation and/or placement of the molecule solution can be automated.

In some instances, the trial generation station also optionally includes one or more additive placeholders 120 that are each configured to hold an additive plate (not shown). The additive plates can each include a plurality of wells. In some instances, the number of wells in an additive plate is equal to the number of well regions on a CP. Further, the wells on the additive plate can be positioned in the same arrangement as the well regions on the CP. The wells on the additive plate are each configured to hold an additive solution that includes an additive. The additive solutions can be added to the mother liquors before preparation of the crystallization trials. The additive solution may be manually prepared and a molecule plate(s) may be manually placed in the placeholder. Alternately, the preparation and/or placement of the additive solution can be automated.

In some instances, the CPs, the additive plates and/or the molecule plates employed in conjunction with the system have the about the same footprint. In these instances, the CP placeholders 116, additive placeholder 120 and/or molecule placeholders 118 can be used interchangeably. For instance, if a molecule plate and an additive plate have about the same footprint, the same placeholder can be employed to hold either plate.

The trial generation station also includes a wash station 122. A suitable wash station 122 includes a vessel through which a wash fluid can be circulated. In some instance, the wash station 122 includes one or more vacuum ports.

The trial generation station also includes transfer mechanism configured to transfer mother liquor from the well regions of a CP to the sample regions of the CP. For instance, the illustrated trial generation station includes a head 123 that can be moved vertically as shown by the arrow labeled V in FIG. 3O and laterally as shown by the arrows labeled L in FIG. 3O. FIG. 3Q through FIG. 3S illustrate a suitable construction of a head 123 for use with the trial generation station. FIG. 3Q is a perspective view of the head 123. FIG. 3R is a side view of the head 123 shown in FIG. 3Q taken in the direction of the arrow labeled 3R and FIG. 3S is a side view of the head 123 shown in FIG. 3Q taken in the direction of the arrow labeled 3S.

The head 123 includes a plurality of fluid dispensers 124. In some instances, the number of fluid dispensers 124 on the head 123 is equal to the number of well regions in a CP. Further, the fluid dispensers 124 can be positioned on the head 123 in the same arrangement as the well regions are positioned on a CP. As a result, when a CP is positioned under the head 123, the head 123 can be lowered such that each fluid dispenser 124 is positioned in a well region. Further, when the wells on the molecule plate are in the same arrangement as the well regions on the CP, the head 123 can be lowered such that each fluid dispenser 124 is positioned in a well of the molecule plate. Additionally, when the wells on the molecule plate are in the same arrangement as the well regions on the CP, the head 123 can be lowered such that each fluid dispenser 124 is positioned in a well of the additive plate. Suitable fluid dispensers 124 include, but are not limited to, fluid dispensers 124 with a range of 50 nL to 200 nL and a CV below 10%.

The head 123 can include one or more secondary dispensers 126 in addition to the fluid dispensers 124. In some instances, a secondary dispenser 126 is employed to extract molecule solution from the molecule plate and to dispense the molecule solution into the sample region of the trial zones on the CP. In some instances, a secondary dispenser 126 is employed to extract additive solution from an additive plate and to dispense the additive solution into the well region of the trial zones on the CP. Additionally, the head 123 can include a plurality of secondary dispensers 126. One secondary dispenser 126 can be employed to dispense molecule solution and another secondary dispenser 126 can be employed to dispense additive solution. A suitable secondary dispenser 126 includes, but is not limited to, dispensers with a range of 50 nL to 200 nL and a CV below 10%.

In some instances, the fluid dispensers 124 are vertically immobilized relative to the head 123 and one or more secondary dispensers 126 can be moved vertically relative to the fluid dispensers 124 as illustrated by the arrow labeled D in FIG. 3Q, FIG. 3R and FIG. 3S. The vertical movement of a secondary dispenser 126 allows the secondary dispenser 126 to access a solution in a well without interference from the fluid dispensers 124. As an alternate to the secondary dispenser 126 being vertically movable relative to the fluid dispenser 124, the secondary dispenser 126 can be vertically immobilized relative to the head 123 and the fluid dispensers 124 can be moved vertically relative to the secondary dispenser 126. Further, the head 123 can be constructed such that the secondary dispenser 126 are vertically movable relative to the fluid dispenser 124 and the fluid dispensers 124 are vertically movable relative to the secondary dispenser 126. One or more of the secondary dispensers 126 can be located outside the perimeter of a grouping of fluid dispensers 124 as is evident in FIG. 3Q. This arrangement can reduce interference from the fluid dispensers 124 during operation of a secondary dispenser 126.

One or more secondary dispenser 126 can be laterally immobilized relative to the fluid dispensers 124. Lateral immobilization of a secondary dispenser 126 causes the lateral position of the secondary dispenser 126 to be constant relative to the lateral positions of the fluid dispensers 124. As a result, the lateral position of the secondary dispenser 126 is automatically calibrated upon calibrating the lateral positions of one or more fluid dispensers 124. Alternately, the lateral positions of the fluid dispensers 124 are automatically calibrated upon calibrating the lateral position of the secondary dispenser 126. Accordingly, lateral immobilization of the secondary dispenser 126 relative to one or more fluid dispensers 124 can reduce maintenance required for the trial generation station. In some instances, the fluid dispensers 124 are laterally immobilized relative to one another.

The head 123 can also include one or more piercers 128. An example piercer 128 includes, but is not limited to, a rod having a diameter up to 0.5 cm. The piercer 128 is configured to move vertically relative to the head 123 as illustrated by the arrow labeled P. The movement of the piercer 128 can be pneumatically or hydraulically generated. A molecule plate and/or an additive plate is often positioned on the deck 115 with a material positioned over the wells on the plate. The head 123 can be moved so as to position the piercer 128 over a well from which a solution is to be withdrawn. The piercer 128 can be lowered to pierce the material such that an opening is left in the material. A solution in the well can be accessed through the opening in the material. Examples of suitable materials for positioning on the plate to be pierced by the piercer 128 include, but are not limited to, aluminum foil.

During operation of the trial generation station, a filled CP is transported to a CP placeholder 116. The filled CP has mother liquor positioned in the well regions of the trial zones. The trial generation station generates crystallization trials in the trial zones by performing a plurality of liquid transfer operations. For instance, the trial generation station can transfer mother liquor from the well region of each CP that contains a mother liquor into the associated sample region. The trial generation station also transfers a molecule solution from the molecule plate into the sample region of each trial zone. The molecule solution and the mother liquor added into the sample region of a trial zone combine to form the sample. The molecule solution can be transferred to the sample region of a trial zone before or after the mother liquor is transferred to the sample region of the trial zone.

The trial generation station can be configured such that CP remains stationary in the same location on the deck 115 during the generation of the sample. Allowing the CP to remain stationary in the same location reduces problems associated with alignment between the head 123 and the CP during the sequential positioning of the head 123 relative to the CP.

In some instances, the trial generation station transfers additive solution from one or more wells of one or more additive plates into the well region of one or more trial zones. This transfer of additive solution can be performed before the mother liquors are transferred from the well regions into the sample region of the trial zones. As a result, the additive solutions are added to the mother liquors before the sample is formed.

When the mother liquor is transferred from the well region into the sample region of each trial zone, the head 123 is moved over the CP and lowered such that the tip of each fluid dispenser 124 is in the mother liquor positioned in the well region of each trial zone. The fluid dispensers 124 extract a portion of the mother liquor from each of the well regions. The head 123 is raised such that each of the fluid dispensers 124 is withdrawn from the mother liquors. The head 123 is moved so as to move the dispensers from over the well regions of the trial zones to a position over the sample regions of the trial zones. The extracted mother liquor is dispensed from each dispenser into the sample region of the trial zones. In the movement of the head 123 before dispensing the mother liquors, each dispenser is moved from over the well region of a particular trial zone to a position over the sample region associated with the same trial zone. As a result, the mother liquor in the sample region and the mother liquor in the well region of a trial zone is the same.

A parallel transfer of molecule solution can be employed to transfer molecule solution(s) from the molecule plate into the trial zones. For instance, the head 123 can be moved over the molecule plate and lowered such that the tip of each fluid dispenser 124 is in a well of a molecule plate. The fluid dispensers 124 then extract a portion of the molecule solution from the wells that actually contain molecule solution. In some instances, the molecule solutions are extracted concurrently. The head 123 is raised so as to withdraw the fluid dispensers 124 from the molecule solutions. The head 123 is moved such that each fluid dispenser 124 is positioned over the sample regions of a trial zone. When the molecule plate wells have the same number and arrangement as the trial zones, the head 123 can move to this position without laterally moving the fluid dispensers 124 relative to one another. The extracted molecule solutions are dispensed from the fluid dispensers 124 into the sample region of the trial zones. In some instances, the molecule solutions are dispensed concurrently. This parallel molecule solution transfer reduces the time required for formation of the crystallization trials and allows a plurality of the samples to be formed concurrently. Further, one or more wells in the molecule plate can include different molecule solutions. As a result, different molecule solutions can be delivered into different trial zones.

As an alternate to parallel transfer of the molecule solutions, the molecule solutions can be transferred in series. For instance, the head 123 can be moved such that the secondary dispenser 126 is located over a well in the molecule plate. The head 123 is lowered so as to place the tip of the secondary dispenser 126 in the molecule solution. The desired amount of molecule solution is extracted from the well and the head 123 is raised so as to remove the secondary dispenser 126 from the well of the molecule plate. The head 123 is then moved so as to position the secondary dispenser 126 over a sample region of a trial zone and the desired volume of molecule solution is dispensed into the trial zones. The head 123 can then be moved so as to dispense the molecule solution into another of the trial zones. In some instances, the molecule solution is transferred from a single well on the molecule plate into each of the trial zones on a CP. As a result, the molecule solution can be the same in each trial zone. Alternately, the secondary dispenser 126 can transfer the molecule solution into a portion of the trial zones and then return to a different well of the molecule plate and extract a second molecule solution. The second molecule solution can be dispensed into a different selection of trial zones than the first molecule solution. As a result, the secondary dispenser 126 can dispense different molecule solutions into different trial zones.

A parallel transfer of additive solution can be employed to transfers additive solution from the molecule plate into the trial zones. For instance, the head 123 can be moved over the additive plate and lowered such that the tip of each fluid dispenser 124 is in a well of an additive plate. The fluid dispensers 124 extract a portion of the additive solution from the wells that actually contain additive solution. In some instances, the additive solutions are dispensed concurrently. The head 123 is raised so as to withdraw the fluid dispensers 124 from the additive solutions. The head 123 is moved such that each fluid dispenser 124 is positioned over the well region of a trial zone. When the additive plate wells have the same number and arrangement as the trial zones, the head 123 can move to this position without laterally moving the fluid dispensers 124 relative to one another. The extracted additive solutions are dispensed from the fluid dispensers 124 into the sample region of the trial zones. In some instances, the additive solutions are dispensed concurrently. This parallel additive solution allows different additive solutions to be efficiently delivered into different trial zones. For instance, one or more wells in the additive plate can include different additive solutions. As a result, the parallel transfer of the additive solutions places different additive solutions in different trial zones.

As an alternate to parallel transfer of the additive solutions, the additive solutions can be transferred in series. For instance, the head 123 can be moved such that the secondary dispenser 126 is located over a well in the additive plate. The head 123 is lowered so as to place the tip of the secondary dispenser 126 in the additive solution. The desired amount of additive solution is extracted from the well and the head 123 is raised so as to withdraw the secondary dispenser 126 from the well of the additive plate. The head 123 is then moved so as to position the secondary dispenser 126 over the well region of a trial zone and the desired volume of additive solution is dispensed into the trial zones. The head 123 can then be moved so as to dispense the additive solution into another of the trial zones. In some instances, the additive solution is transferred from a single well on the additive plate into each of the trial zones on a CP. As a result, the additive solution can be the same in each trial zone. Alternately, the secondary dispenser 126 can transfer the additive solution into a portion of the trial zones and then return to a different well of the additive plate and extract a second additive solution. The second additive solution can be dispensed into a different selection of trial zones than the first additive solution. As a result, the secondary dispenser 126 can dispense different additive solutions into different trial zones.

In some instances, a material is positioned over one or more wells on the molecule plate before molecule solution is extracted from these wells. Additionally or alternately, a material can be positioned over one or more wells on the additive plate before additive solution is extracted from these wells. In these instances, the head 123 can be moved so as to position the piercer 128 over a well from which a fluid is to be withdrawn. The piercer 128 can be lowered to pierce the material such that an opening is left in the material. This process can be repeated so as to create an opening over each well from which solution is to be extracted. After piercing the material, the head 123 can be moved so one or more dispensers are positioned over a well that has been pierced. The one or more dispensers can be lowered into the well(s) through the opening(s).

In some instances, it is desirable to mix the contents of the CP after additive solutions have been added to the mother liquors. As a result, after the trial generation station transfers additive solutions from an additive plate to a CP, the transport mechanism may transport the CP from the trial generation station to the mixing station before the trial generation station performs additional liquid transfer operations.

It may be desirable to wash the fluid dispensers 124 and/or the secondary dispenser 126 after performing any of the liquid transfer operations described above. When washing is desired, the head 123 can be move such that the fluid dispensers 124 and/or the secondary dispenser 126 is located over the wash station 122. The washing can be performed by repeatedly extracting and dispensing a wash solution from a vessel in the wash station 122. When one or more vacuum ports are available, the dispensers are moved into position over the one or more vacuum ports and a vacuum is applied to remove any liquid remaining on the tips of the dispensers.

The trial generation station can be adapted for use with hanging drop trials. For instance, the head 123 can be configured to transfer mother liquor and the molecule solution onto one or more well covers. The trial generation station can also include a cover mechanism for placing the one or more well covers over the correct well regions.

FIG. 3T is a perspective view of a mixing station that is suitable for use with the system. The mixing station includes a stage 130 with a plurality of plate placeholders 132 where CPs or SSPs can be positioned by the transport mechanism. Accordingly, one or more CPs and/or one or more SSPs can be positioned on the stage. The stage is configured to vibrate or shake such that the contents of the trial zones and/or the trial zones are agitated. A suitable mixing station includes, but is not limited to, a rotary mixing station such as a DPC RS232 made by Diagnostic Products Corporation in Los Angeles, Calif.

FIG. 3U is a perspective view of a sealing station configured to seal the crystallization trials on a crystallization plate form the atmosphere. The sealing station can apply a sealing medium to the CPs. The sealing station includes a stage 134 where a CP 24 can be positioned by the transport mechanism. The sealing station includes a source of sealing medium and applies the sealing medium to the CP positioned on the stage. The sealing medium is preferably applied with a low level of heat transfer to the CP in order to reduce evaporation issues. An example of a suitable sealing station for use with the system includes, but is not limited to a Zymark PRESTO Microplate Sealing Workstation made by Zymark, Inc. located in Hopkinton, Mass.

FIG. 3V is a perspective view of an imaging station. The imaging station includes a stage 136 having a plurality of placeholders 138 where the transport mechanism can place a CP. The imaging station includes a gantry mounted camera 140 that can be moved relative CPs. The camera 140 can be controlled so as to generate an image of the sample region in a portion of the trial zones on a CP or in each of the trial zones on the CP. In some instances, the camera is controlled so as to generate an image that includes the sample region and areas outside of the sample region. In some instances, the camera is controlled so as to generate an image of the sample in the sample region. Accordingly, the image station can generate an image of the sample in each crystallization trial. The imaging station can digitally store generated images internally and/or make the image available to the controller. Accordingly, an operator can access the images through the imaging station or through the controller. Although the stage is shown with three placeholders, the stage can have one or more placeholders. A suitable imaging station for use with the system includes, but is not limited to, a Bio-TOM Automated Picture System made by Bio-TOM located in Evry, France.

FIG. 3W is a perspective view of a transport mechanism that is suitable for use with the system. The transport mechanism includes a plurality of members 150 connected together to form a robotic arm. The members connect a base 152 to a functional end 154. The functional end is configured to grasp the plates that are transported by the transport mechanism. The members 150 are connected so as to allow the components to move relative to one another. The number of components and the structure of the connections are selected to allow the controller to control movement of the transport mechanism within a desired perimeter while the transport mechanism holds a plate in substantially horizontal position.

FIG. 3X is a top view of a suitable functional end for use with the transport mechanism. The functional end includes a plurality of arms 156. The arms can be moved together and apart as illustrated by the arrow labeled A. The functional end grasps a plate 157 by positioning the arms on opposing sides of a plate and then moving the arms together. The functional end releases a plate by moving the arms apart.

The functional end can include a bar code reader 158. The bar code reader 158 can be positioned so as to read a bar code positioned on a plate grasped by the functional end. Although the bar code reader is shown positioned above the arms, the bar code reader can be positioned below the arms or between the arms.

A portion of the above stations are described as including placeholders for a variety of structures such as SSPs, CPs, molecule plates, additive plates, bottles and sets of receptacles. The placeholders are configured to restrain movement of these structures on the stations. Suitable placeholders can include one or more ridges that extend from a stage, platform or deck. Alternately, suitable placeholders can include a recess configured to receive these structures in a stage, platform or deck. FIGS. 3Y through 3AA illustrate examples of suitable placeholders for use with the above stations. FIG. 3Y and FIG. 3Z are perspective views of a placeholder including a plurality of ridges 160 extending from a deck 162. The ridges 160 are arranged such that a plate 164 positioned between the ridges are constrained to a position between the ridges as shown in FIG. 3Z.

FIG. 3AA is a perspective view of another example of a suitable placeholder. The placeholder includes a recess 166 extending into a deck 170. The recess 166 can be shaped such that the position of a plate positioned in the recess 166 is constrained on the deck 170.

In each of the stations described above, the placeholders are optional. For instance, the plates can be positioned directly on a deck without any structure to preserve the plate position.

Figure 4A:
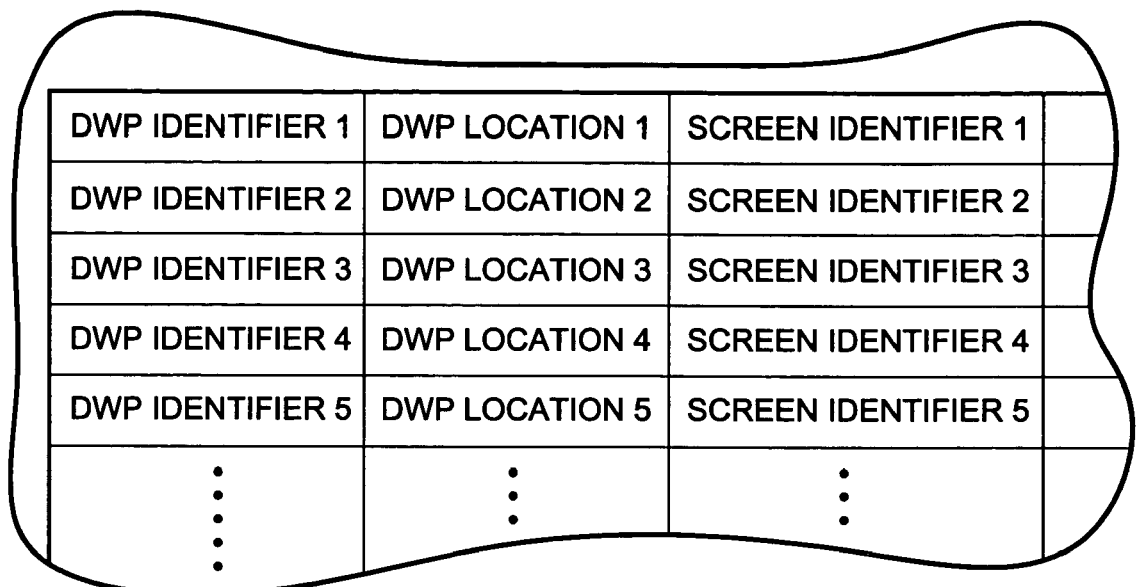
FIG. 4A through FIG. 4C illustrate databases that can be employed by the controller during operation of the system.

The controller can access and/or maintain a variety of databases during the operation of the system. FIG. 4A illustrates an example of an SSP tracking database that can be employed by the controller. The SSP tracking database stores data for a plurality of SSPs. For each SSP in the database, the SSP tracking database associates an SSP identifier with an SSP location identifier and a screen identifier. The controller can employ the SSP identifier to identify a particular SSP during operation of the system. As an example, an SSP can include a bar code as disclosed above. Each screen identifier can be associated with a particular bar code. As a result, when the transport mechanism approaches or grasps a targeted SSP, the controller can compare the bar code on the SSP with a screen identifier to determine whether the SSP being approached or grasped is the targeted SSP.

The SSP location identifier indicates the position of the associated SSP in the system. The SSP location identifier can indicate the station where the associated SSP is positioned. In some instances, the SSP location identifier also indicates the location of the SSP at that station. For instance, the SSP location identifier can indicated that the SSP is located in a particular port in the screen storage station. The controller can update the SSP tracking database to reflect the new location of an SSP each time the SSP is moved. As a result, the controller can employ the SSP location identifier to identify the location of a particular SSP in the system.

The screen identifier is associated with a particular selection of screen solutions. For instance, the screen identifier can indicate the contents of the SSP wells in an SSP associated with that screen identifier. In some instances, the screen identifier indicates that the SSP wells are empty. The screen identifier can take a variety of forms. In some instances, the screen identifier is a name that is used to identify a particular screen. Alternately, the screen identifier can list the contents of each SSP well. Alternately, the screen identifier can be a simpler identifier that can be associated with a separate listing of the SSP well contents. As a result, the screen identifier allows the controller to identify the screen that is contained in a particular SSP or allows the controller to identify an SSP that contains a particular screen.

Although the SSP identifier, the SSP location identifier and the screen identifier are each shown as requiring a single column in the database, one or more of these identifiers may require more than one column of the database.

The SSP tracking database can include a variety of additional information that is not illustrated. For instance, the SSP tracking database can include information about the volume of the screen solutions in the SSP wells, the number of times an SSP has been accessed, the dates when an SSP has been accessed and/or the molecule(s) with which the SSP was used and/or the CP(s) with which the SSP was used. The SSP tracking database can also include a storage station identifier associated with one or more of the SSP identifiers. The storage station identifier can indicate where the SSP is or was stored in the screen storage station. The controller can use the storage station identifier to return the SSP to the same location in the screen storage station after using the SSP at another station.

Figure 4B:
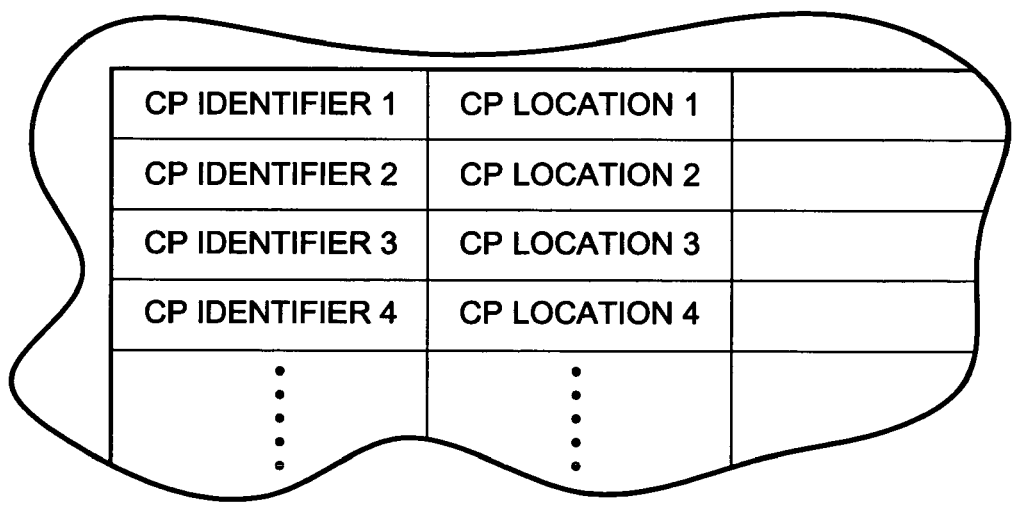

FIG. 4B illustrates an example of a CP tracking database that can be employed by the controller. The CP tracking database stores data for a plurality of CPs. For each CP in the database, the SSP tracking database associates a CP identifier with a CP location identifier. The controller can employ the CP identifier to identify a particular CP during operation of the system. As an example, the CP can include a bar code as disclosed above. Each CP identifier can be associated with a particular bar code. As a result, when the transport mechanism approaches or grasps a targeted CP, the controller can compare the bar code on the CP with the CP identifier to determine whether the transport mechanism is approaching the targeted CP.

The CP location identifier indicates the position of the associated CP in the system. For instance, the CP location identifier can indicate the station where the associated CP is positioned and the location of the CP at that station. For instance, the CP location identifier can indicate that the CP is located at a particular placeholder on a particular station. The controller can update the CP tracking database to reflect the new location of a CP each time the CP is moved. As a result, the controller can employ the CP location identifier to identify the location of a particular CP in the system.

Although the CP identifier and the CP location identifier are each shown as requiring a single column in the database, one or more of these identifiers may require more than one column of the database.

The CP tracking database can include a variety of additional information that is not illustrated. For instance, the CP tracking database can include information about: the screen employed to generate the crystallization trials in the CP; the molecule employed to generate the crystallization trials in the CP and the additive employed to generate the crystallization trials.

Figure 4C:
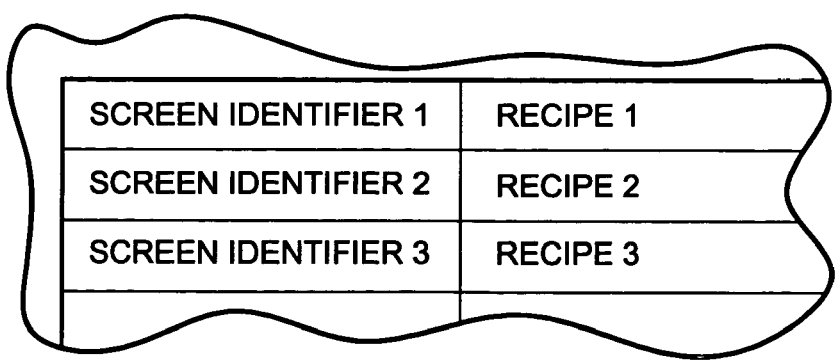

FIG. 4C illustrates an example of a screen generation database that can be accessed by the controller. The screen generation database associates screen identifiers with a screen recipe. A screen recipe provides the data needed for the controller to employ the screen generation station to generate a screen in an SSP. An example recipe lists the volume of each component solution that is to be transferred into an SSP well for each of the SSP wells in an SSP. A recipe can indicate that no component solution is to be delivered into one or more SSP wells. Additionally or alternately, a recipe can indicates that a single component solution is to be delivered into one or more SSP wells. When the recipe is for a coarse screen, the recipe can indicate that each SSP well is to receive a single component solution from a different bottles. When the recipe is for a optimization screen, a recipe can indicate that one or more SSP wells are to receive component solutions from one or more of the bottles and/or one or more receptacles. Accordingly, a recipe can indicate that component solutions are to be mixed in an SSP well.

Although the SSP tracking database, the CP tracking database and the screen generation databases are disclosed as independent databases, these databases may be combined in a single database. Additionally, these databases may occur in a different format than the illustrated format.

Figure 5A:
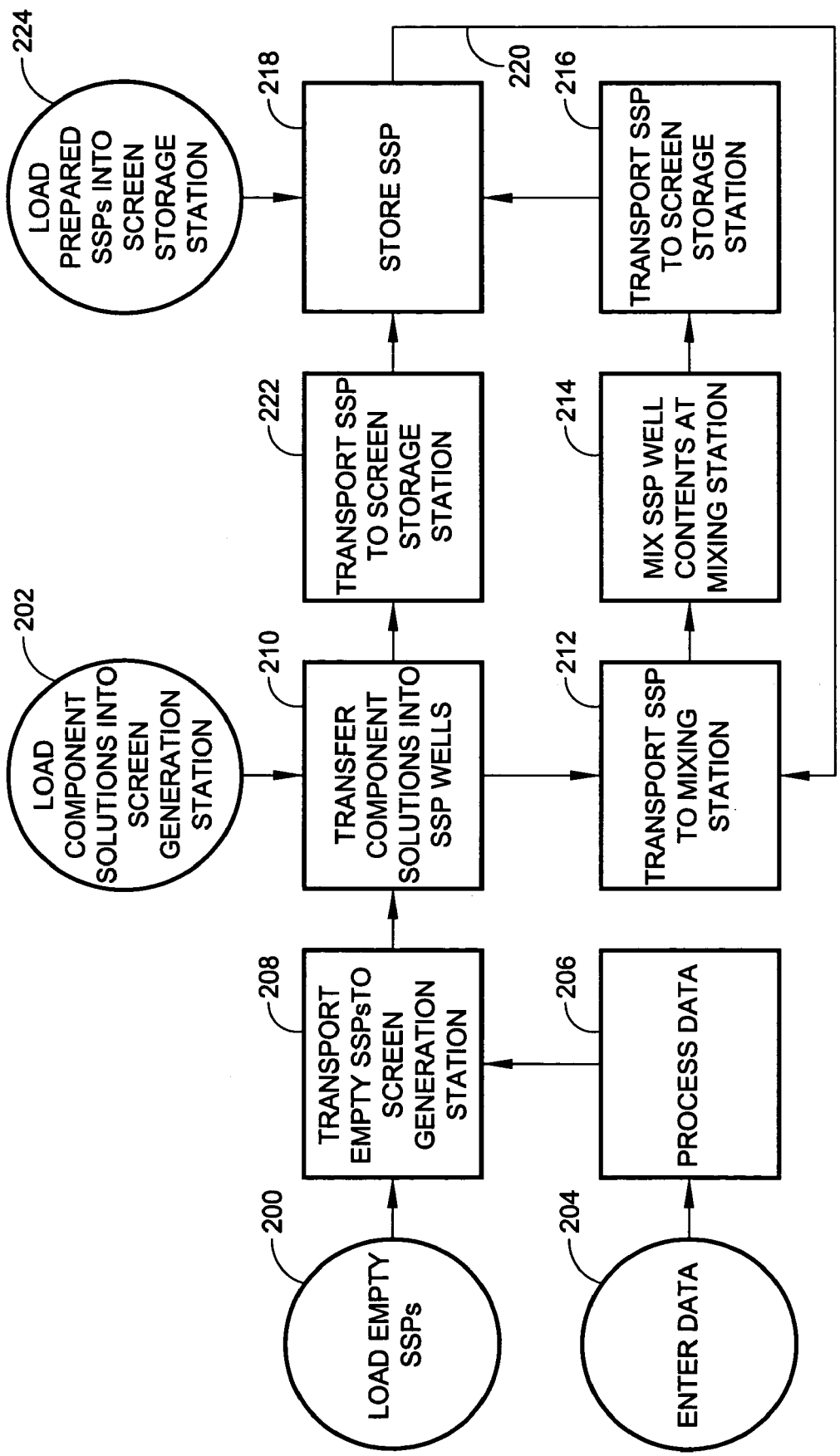
FIG. 5A and FIG. 5B illustrate methods of operating the system.

FIG. 5A illustrates a method of operating the system so as to generate a screen library that is stored in the screen storage station. Each of the screens in the screen library can be different. Alternately, a portion of the screens in the screen library can be the same. The screens in the screen library can be used by the system at a later time. FIG. 5A employs a plurality of rectangular blocks and a plurality of round blocks to illustrate the method. The controller can include logic for causing the transport mechanism and/or the stations to execute the operations related to the square blocks. The operations shown in the round blocks can be executed manually, mechanically or by an automated machine. Alternately, the controller can include logic for causing the transport mechanism and/or the stations in the system to execute the operations related to the round blocks or for causing additional station to execute these operations.

Empty SSPs are provided to the system at block 200. Each empty SSP can be loaded into a port of the screen storage station.

The component solutions that are required to generate the screen library are loaded into the screen generation station at block 202. The component solutions can be in receptacles and/or bottles. The bottles and/or the receptacles can be placed in the placeholders on the screen generation station.

Data is provided to the controller at block 204. An operator can employ one or more of the user interfaces to enter the data. For instance, the operator can input the location of each component solution in the screen storage station. Further, the operator can modify the SSP tracking database to reflect the addition of the empty SSPs to the screen storage station. For instance, the operator can modify the SSP tracking database to include: the SSP identifiers for each of the empty SSPs; the SSP location identifier associated with the location of each of the empty SSPs; and the screen identifier indicating the empty nature of the empty SSPs.

The operator can input a task list to the system. An example task list lists the screens that are to be prepared in SSPs for storage in the screen storage station. The task list can include a listing of screen identifiers. For each of the listed screen identifiers, the controller is to generate an SSP having the screen solutions associated with that screen identifier.

The controller processes the data input to the system at block 206. For instance, the controller can compare the screen identifiers in the task list with the screen generation database to identify the recipe associated with each screen in the task list. The controller can identify whether each of the component solutions called for in the recipes is present in the screen generation station. Further, the controller can review the screen identifiers in the SSP tracking database to determine the number of empty SSPs available. This number can be compared against the number of entries in the task list to determine whether there are enough empty SSPs available to complete the task list. In the event that one or more conditions are not met, the controller can employ one or more user interfaces to notify the operator of the condition. For instance, the controller can display a message on a monitor to indicate that additional empty SSPs are required to complete the task list.

At block 208, the controller identifies an empty SSP stored in the screen storage station. For instance, the controller can access the SSP tracking database and review the screen identifiers to identify an empty SSP in the screen storage station. The identified SSP is retrieved from within the screen storage station. The identified SSP is transported from the screen storage station to the screen generation station. At block 210, the component solutions are transferred from the bottle and/or the receptacles into the SSP wells. The component solutions are transferred in accordance with the recipes entered at block 204. The one or more component solutions delivered into an SSP well serve as a screen solution in that SSP wells. The component solutions can be transferred such that each of the SSP wells on an SSP plate contains a screen solution. Alternately, the component solutions can be transferred such that a portion of the SSP wells in the SSP plate contain a screen solution.

At block 210, the SSP can be transported from the sealing station to the mixing station at block 212. The screen solutions are mixed at block 214. The SSP is transported to the screen storage station at block 216. The SSP is stored in the screen storage station at block 218. In some instances, a covering device covers the identified SSP before the SSP is stored. Before or after the SSP is stored in the screen storage station, the controller can modify the SSP location identifier in the SSP tracking database to reflect the position of the SSP in the screen storage station and/or modify the screen identifier in the SSP tracking database to reflect the screen that has been generated in the SSP wells of the SSP.

In some instances, one or more of the SSPs in the screen storage station is periodically mixed. For instance, an SSP can be periodically transported from the screen storage station to the mixing station as illustrated by the arrow labeled 220. The SSP is then mixed and returned to the screen storage station as indicated by block 214 and block 216. Periodic mixing of the stored screens can preserve the integrity of the screen solutions and/or prevent settling, separation and/or precipitation of screen components.

In some instances, the system may not include a mixing station or mixing may not be desired. As a result, the SSP can be transported directly from the screen generation station to the screen storage station as indicated by block 222.

The method disclosed with respect to block 200 through block 222 can be repeated such that a plurality of SSPs are added to the screen storage station and are accordingly added to the screen library. In some instances, SSPs prepared outside the system can be manually added to the screen storage station and accordingly to the screen library as shown in block 224. For instance, an operator can manually prepare an SSP. The manually prepared SSP can be placed in a port on the screen storage station. The operator can employ one or more of the user interfaces to modify the SSP tracking database to reflect the manually added SSP. For instance, the operator can enter into the SSP tracking database the SSP identifier and the position of the SSP in the screen storage station.

Figure 5B:
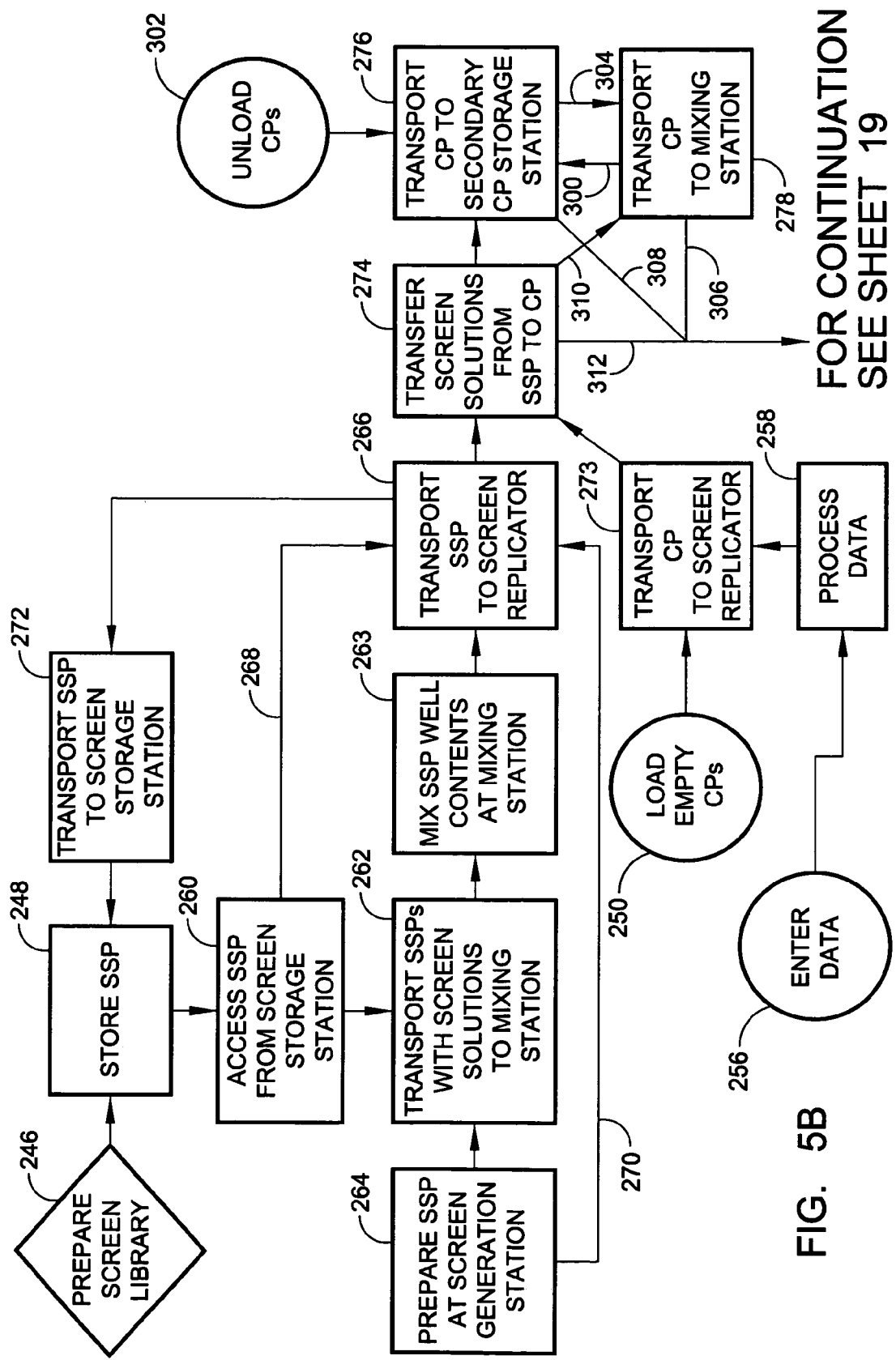
Figure 5B:
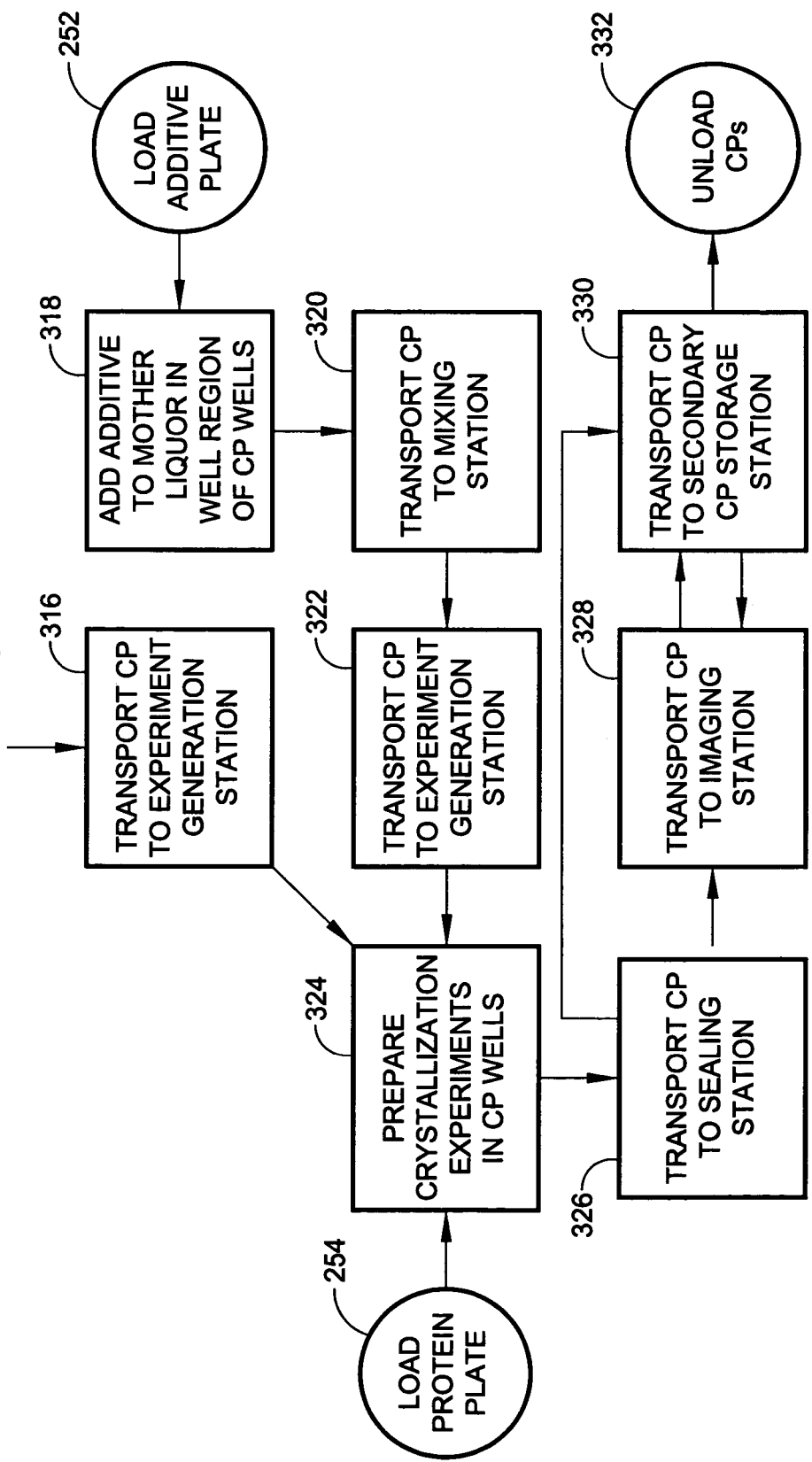

FIG. 5B illustrates a method of operating the system so as to prepare a CP having crystallization trials. FIG. 5B employs a plurality of rectangular blocks, round blocks and diamond shaped blocks to illustrate the method. The controller can include logic for causing the transport mechanism and/or the stations to execute the operations related to the square blocks. The operations shown in the round blocks can be executed manually, mechanically or by an automated machine. Alternately, the controller can include logic for causing the transport mechanism and/or the stations in the system to execute the operations related to the round blocks or for causing additional station to execute these operations. The operations shown in the diamond shaped blocks can completely or partially performed as described in the method of FIG. 5A.

A screen library is prepared and stored in the screen storage station as shown at block 246 and block 248. The screens can be prepared and stored according to the method disclosed with respect to FIG. 5A. Empty CPs are provided to the system at block 250. The empty CPs can be loaded into the tower of a primary CP storage station one by one. Alternately, the tower can be removed from the primary CP storage station and replaced with a tower having empty CPs.

When an additive will be used with one or more of the crystallization trials, one or more additive plates is provided to the system at block 252. The additive plate can be loaded into a placeholder on the sample generation station and can include one or more wells that each contain an additive solution. The additive solutions in different wells can be the same or different.

One or more molecule plate is provided to the system at block 254. The molecule plate can be loaded into a placeholder on the sample generation station and can include one or more wells that each contain a molecule solution. The molecule solutions in different wells can be the same or different.

Data is provided to the controller at block 256. An operator can employ one or more of the user interfaces to enter data into one or more databases to which the controller accesses and/or maintains. The operator can input the location of one or more additive plates in the system. For instance, the operator can input which placeholder on the sample generation station contains an additive plate. The operator can input the location of the molecule plates in the system. For instance, the operator can input which placeholder on the sample generation station contains a molecule plate.

When a screen is generated outside of the system and the SSP containing the screen is placed into the screen storage station, an operator can employ one or more of the operator interfaces to enter into the SSP tracking database the SSP identifier and SSP location identifier and, in some instances, the screen identifier associated with the SSP. Additionally, an operator can remove SSPs from the screen storage device for a variety of different purposes. For instance, an operator can remove a used SSP for cleaning. Alternately, an operator can remove a filled SSP in order to use the screen in another application. In these instances, an operator can employ one or more user interfaces to modify the SSP tracking database to reflect the removal of the SSP from the screen storage database.

An operator can also input a task list to be performed by the system. The task list can indicate one or more CPs is to be prepared. An operator can employ one or more of the user interfaces to input data for the preparation of each CP. For each CP to be prepared, the operator inputs data that allows the system to associate a screen identifier with a molecule location and additive location(s). When a CP is to be prepared with crystallization trials, the system prepares the crystallization trials using an SSP that contains the screen associated with the screen identifier, the molecule at the identified location and the additive(s) at the identified location. In some instances, the data is input such that an additive solution is not associated with a screen identifier and/or a molecule solution is not associated with a screen identifier. In these instances, the system can prepare the CP without the molecule solution and/or without an additive.

The controller processes the data input to the system at block 258. For instance, the controller can compare each of the screen identifiers in the task list with the screen identifiers listed in the SSP tracking database. When the screen identifier in the task list matches a screen identifier in the SSP tracking database, the controller accesses the associated location identifier to determine the location of that SSP in the system. The controller can use the SSP at the determined location to generate the CP associated with that task. When the screen identifier in the task list does not match a screen identifier in the SSP tracking database, the screen is not yet available for use in generation of the CP. Accordingly, the controller compares the screen identifier with the screen identifiers in the screen generation database. When the screen identifier matches a screen identifier in the screen generation database, the controller can employ the associated recipe to generate an SSP having the screen at the screen generation station. In the event that one or more conditions are not met, the controller can employ one or more user interfaces to notify the operator of the condition. For instance, the controller can display a message on a monitor to indicate that one or more of the screens on the task list is not available or that there is no recipe available for generating one or more of the screens on the task list.

The controller selects a task to be completed from the task list. In the event that the SSP needed to complete that task is located in the system, the transport mechanism accesses the SSP at that location. In instances where the SSP is located in the screen storage station, the screen storage station retrieves the identified SSP. The identified SSP is transported from the screen storage station as shown at block 260. In some instances, a covering device uncovers the identified SSP before the identified SSP is transported from the screen storage station.

As noted with respect to the discussion of block 258, the controller may need to generate a screen for use with a task in the task list as illustrated by block 264. In these instances, the controller can identify the location of an empty SSP in the screen storage station as disclosed with respect to the method of FIG. 5A. The screen storage station retrieves the identified SSP from within the screen storage station. The empty SSP is transported from the screen storage station to the screen generation station. The component solutions are transferred from the bottle and/or the receptacles into the empty SSP wells in accordance with the recipe identified at block 258. The one or more component solutions delivered into an SSP well serve as a screen solution in that SSP wells.

SSPs generated at the screen generation station or retrieved from the screen storage station are transported to the mixing station at block 262 and mixed at block 263. The SSPs are transported from the mixing station to the screen replicator at block 266. In some instances, an SSP can be transported directly from the screen storage station to the screen replicator as illustrated by the arrow labeled 268. Further, an SSP can be transported directly from the screen generation station to the screen replicator as illustrated by the arrow labeled 270. In some instances, the SSP is already located at the screen replicator and need not be transported to the screen replicator. For instance, a desired SSP can be used one or more times at the screen replicator and then left at the screen replicator for additional use at a later time. In these instances, the controller will identify that the identified SSP is located at the screen replicator when executing block 258. The controller can leave the SSP in place at the screen replicator or can transport the SSP to the mixing station and return the SSP to the screen replicator.

The CP is transported from a primary CP storage station to the screen replicator at block 273. At block 274, the screen replicator transfers the screen solutions from the SSP wells of the SSP to the well regions of the trial zones. The screen replicator can be operated such that each screen solution in the SSP is transferred to the CP. Alternately, the screen replicator can be operated such that a portion of the screen solutions in the SSP are transferred to the CP. Further, the screen replicator can be operated such that each trial zone that receives a screen solution receives the screen solution from a single SSP well.

The screen solution transferred into a trial zone can serve as a mother liquor in that trial zone or can be combined with one or more other components that act together as the mother liquor. The controller updates the CP tracking database to include the CP identifier associated with the CP, the CP location identifier showing the location of the CP at the screen replicator and the SSP identifier for the SSP from which the mother liquor was extracted to fill the SSP wells.

As noted above, the SSP wells can be configured to hold enough screen solution for multiple CPs. Accordingly, the SSP can remain at the screen replicator while multiple empty CPs are transported to the screen replicator. The screen solutions can be transferred into the trial zones of more than one CP transported to the screen replicator. When the SSP is no longer required at the screen replicator, the SSP is transported to the screen storage station at block 272 and stored in the screen storage station at block 248. In some instances, the SSP is covered before being stored in the screen storage station.

The CP may be transported from the screen replicator to a secondary CP storage station before being transported to the sample generation station. For instance, the CP can be transported from the screen replicator to a secondary CP storage station as shown at block 276. Alternately, the CP can be transported from the screen replicator to the mixing station and mixed at block 278. The CP can be then transported from the mixing station to a secondary CP storage station as illustrated by the arrow labeled 300. Transporting the CP to a secondary CP storage station before transporting the CP to the sample generation station may be appropriate when the task list for a particular CP does not list the location of a molecule to be employed with the CP or when the CP is to be removed from the system before generation of the crystallization trials as illustrated at block 302.

A CP can be transported from a secondary CP storage station to the sample generation station. For instance, a CP can be transported from the secondary CP storage station to the mixing station as illustrated by the arrow labeled 304 and then to the sample generation station as illustrated by the arrow labeled 306. Alternately, the CP can be transported directly from the secondary CP storage station to the sample generation station as illustrated by the arrow labeled 308. An example of a suitable condition for transporting a CP from the secondary CP storage station to the trial generating station includes, but is not limited to, the condition that a task list is modified so as to associate the location of a molecule solution on the sample generation station with a CP stored in the secondary CP storage station.

A CP may be transported to the sample generation station without being transported to a secondary CP storage station. For instance, a CP can be transported from the screen replicator to the mixing station as illustrated by the arrow labeled 310 and then to the sample generation station as illustrated by the arrow labeled 306. Alternately, the CP can be transported directly from the screen replicator directly to the sample generation station as illustrated by the arrow labeled 312. An example of a suitable condition for transporting a CP from the screen replicator to the sample generation station includes, but is not limited to, when the task list associates the location of a molecule solution on the sample generation station with the CP.

As disclosed above, the CP can be transported to the trial preparation station from the screen replicator, from the mixing station or from the secondary CP storage station as shown by the arrows leading to block 316.

In the event that an additive solution is to be used with the CP, the additive solution can be dispensed into the well region of one or more trial zones as illustrated at block 318. The additive solution is extracted from one or more wells in an additive plate. The location of the one or more additive plate wells can be indicated in the task list. Further, the task list can associate particular trial zones with particular wells on the additive plate. As a result, the additive solution from a particular well can be dispensed into particular trial zones. The additive solution can be sequentially dispensed into the trial zones sequentially from the secondary dispenser on the head of the sample generation station. Alternately, the fluid dispensers on the head of the sample generation station can be employed to perform a parallel transfer of additive solutions from a plurality of the additive plate wells into a plurality of the trial zones.

In some instances, a material may be in place over the additive plate wells where the desired additive solution(s) are located. In these instances, the piercer is employed to pierce the material over each of the additive plate wells where a desired additive solution is contained. These additive solutions can be accessed through the openings in the material left by the piercer.

When an additive solution is dispensed into one or more of the trial zones, the CP can be transported from the sample generation station to the mixing station and mixed as shown at block 320. The CP is transported from the mixing station back to the sample generation station at block 322.

At block 324, the sample generation station generates crystallization trials in the CP. The mother liquor from the well regions of one or more trial zones is transferred into the sample region of one or more trial zones. For instance, the fluid dispensers on the head of the sample generation station can be employed to extract the mother liquor from the well region of one or more trial zones and to dispense the mother liquor into the sample region of the one or more trial zones. The sample generation station can be operated such that mother liquor from each trial zone that contains a mother liquor is transferred to a sample region. Alternately, the sample generation station can be operated such that mother liquor from a portion of the trial zones that contains a mother liquor is transferred to a sample region.

When the system is employing hanging drop trials, the sample regions are included on one or more well covers. Accordingly, the sample generation station can transfer mother liquors from one or more well regions to the one or more well covers. The sample generation station can then position the well covers over one or more well regions in the CP. Alternately, the system can include an additional station that positions the well covers over one or more well regions in the CP.

In some instances, the mother liquor is concurrently extracted from the well regions of the trial zones and then concurrently transferred into the sample regions of the trial zones.

Additionally, molecule solution is dispensed into the sample region of one or more trial zones from one or more wells of a molecule plate located on the sample generation station. The location of the one or more molecule plate wells is indicated in the task list. Further, the task list can associate particular trial zones with particular molecule plate wells. As a result, the molecule solution from different molecule plate wells can be dispensed into the sample region of different trial zones. The molecule solution(s) can be sequentially dispensed into the trial zones. Alternately, molecule solution(s) can be concurrently dispensed into a plurality of the trial zones.

In some instances, a material may be in place over the molecule plate wells where the desired molecule solution(s) are located. In these instances, a piercer can be employed to pierce the material over each of the molecule plate wells where a desired molecule solution is contained. These molecule solutions can be accessed through the openings the piercer leaves in the material.

At block 326, the CP can be transported from the sample generation station to the sealing station where the trial zones are sealed. At block 328, the CP can be transported from the sealing station to the imaging station where the contents of the trial zones can be imaged. The images of the crystallization trials can be taken within 30 minutes of generating the last crystallization trial at the sample generation station. In some instances, the images are taken 15 minutes of forming the last crystallization trial, within 5 minutes of forming the last crystallization trials or within 2 minutes of forming the last crystallization trial. In one example, images of the crystallization trials are taken within 1 minute of forming the last crystallization trial, within 30 seconds of forming the last crystallization trial or within 15 seconds of forming the last crystallization trial. At block 330, the CP can be transported to the secondary CP storage station from the imaging station or from the sealing station.

In some instances, one or more of the CPs in the secondary CP storage station is periodically imaged. For instance, a CP can be periodically transported from the secondary CP storage station to the imaging station. The CP contents are imaged at the imaging station and returned to the secondary CP storage station. Periodic imaging of the CPs allows the trial zone contents to be tracked over time. In some instances, the periodic imaging is performed so as to track the sample over time.

An operator can remove a CP from the secondary CP storage station at block 332.

One or more of the stations disclosed with respect to the above system is optional. Additionally, one or more operations in the methods of FIG. 5A and FIG. 5B are optional. For instance, as evident from the above discussion, screens can be prepared outside of the system and placed into the screen storage station for use by the system. Because the screens stored in the screen storage station can be generated outside of the system, the screen generation station is an optional station.

Although the system is disclosed as having a single controller, the system can include a plurality of controller. The controllers can operate the system in conjunction with one another or can perform various operations independent from one another. Further, portions of the controller can be localized to one or more of the stations.

Although each of the stations above are disclosed as being independent, two or more of the stations can be integrated into a single station. For instance, the screen generation station and the screen storage station can be integrated into a single station. Additionally, some of the stations perform more than one operation on a plate. These stations can be separated into multiple stations. As an example, the system can include an additional station for transferring additive solution(s) to the crystal plates. Further, the covering device disclosed in the context of the screen storage station can be a separate station. For instance, when a sealing medium is employed as a cover on the SSPs, the system can include an additional sealing station that serves as the covering device. Alternately, the disclosed sealing station can be employed as a covering device for covering the SSPs.

Although operation of the system is described as being performed by a single operator, the system may require more than one operator. For instance, different operators can provide different inputs to the controller. Further, one or more operators may prepare solutions for use in the system and one or more operators can provide inputs to the controller.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A method comprising:
   having a trial generation station generate crystallization trials in a crystallization plate;
   transporting the crystallization plate to an imaging station; and
   having the imaging station take images of the crystallization trials within 30 minutes of the formation of the crystallization trials; wherein the method is performed in a single automated system.

2. The method of claim 1, wherein the images of the crystallization trials are taken within 15 minutes of the formation of the crystallization trials.

3. The method of claim 1, wherein the images of the crystallization trials are taken within 5 minutes of the formation of the crystallization trials.

4. The method of claim 1, wherein the images of the crystallization trials are taken within 1 minute of the formation of the crystallization trials.

5. The method of claim 1, the method further comprising storing the crystallization plate in a crystallization plate storage station after having the imaging station take images of the crystallization trials.

6. The method of claim 1, the method further comprising having a transport mechanism transport the crystallization plate from the imaging station to the crystallization plate storage station.

7. The method of claim 6, the method further comprising having the imaging station take a second set of images of the crystallization trials after the plate has been stored for a period of time in the crystallization plate storage system.

8. The method of claim 1, wherein a transport mechanism is employed to transport the crystallization plate to the imaging station.

9. The method of claim 8, wherein the transport mechanism is employed to transport the crystallization plate from the trial generation station to the imaging station.

10. The method of claim 8, wherein the transport mechanism includes a robotic arm.

11. The method of claim 1, wherein the crystallization trials include a mother liquor and a sample, the sample having a volume less than 1 μL.

* * * * *